United States Patent
Roh et al.

(10) Patent No.: US 9,385,415 B2
(45) Date of Patent: Jul. 5, 2016

(54) NEAR FIELD COMMUNICATION WITH MATCHING CIRCUITRY

(71) Applicant: Samsung Electronics Co., Ltd., Suwon-si, Gyeonggi-do (KR)

(72) Inventors: Hyoung-Hwan Roh, Seoul (KR); Il-Jong Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/527,059

(22) Filed: Oct. 29, 2014

(65) Prior Publication Data

US 2015/0178526 A1    Jun. 25, 2015

(30) Foreign Application Priority Data

Dec. 23, 2013  (KR) .................. 10-2013-0161772

(51) Int. Cl.
| | |
|---|---|
| G06K 7/10 | (2006.01) |
| H01Q 1/22 | (2006.01) |
| H01Q 7/00 | (2006.01) |
| H01Q 1/52 | (2006.01) |
| H01Q 5/335 | (2015.01) |
| G06K 19/077 | (2006.01) |

(52) U.S. Cl.
CPC .......... *H01Q 1/2216* (2013.01); *G06K 7/10237* (2013.01); *H01Q 1/2225* (2013.01); *H01Q 1/526* (2013.01); *H01Q 5/335* (2015.01); *H01Q 7/00* (2013.01); *G06K 19/07773* (2013.01)

(58) Field of Classification Search
CPC ................................................ G06K 7/10237
USPC ....................................................... 235/375
See application file for complete search history.

(56) References Cited

U.S. PATENT DOCUMENTS

| | | | |
|---|---|---|---|
| 7,783,254 B2 | 8/2010 | Raggam et al. | |
| 7,786,949 B2 | 8/2010 | Kato | |
| 8,368,515 B2 | 2/2013 | Kim | |
| 8,700,827 B2 | 4/2014 | Capomaggio | |
| 2009/0247079 A1* | 10/2009 | Charles ................ | G06K 7/0008 455/41.1 |
| 2010/0207735 A1 | 8/2010 | Kim | |
| 2012/0001701 A1 | 1/2012 | Taniguchi et al. | |
| 2012/0185622 A1 | 7/2012 | Capomaggio | |
| 2013/0109304 A1* | 5/2013 | Marcu ................. | G06K 19/0723 455/41.1 |
| 2013/0109305 A1* | 5/2013 | Savoj ................ | G06K 19/07749 455/41.1 |
| 2013/0119134 A1* | 5/2013 | Tramoni ............ | G06K 19/0726 235/439 |
| 2014/0022143 A1* | 1/2014 | Tramoni .............. | H04B 5/0043 343/861 |
| 2015/0009077 A1* | 1/2015 | Lee ........................ | H01Q 13/10 343/702 |

FOREIGN PATENT DOCUMENTS

| | | |
|---|---|---|
| JP | 2013070369 | 4/2013 |
| KR | 101002530 | 12/2010 |
| KR | 2012078727 | 7/2012 |
| KR | 101189057 | 10/2012 |
| KR | 2013039269 | 4/2013 |

\* cited by examiner

*Primary Examiner* — Christle I Marshall
(74) *Attorney, Agent, or Firm* — Onello & Mello LLP

(57) ABSTRACT

A matching circuit of a near field communication (NFC) device includes a resonance unit connected between a first terminal and a second terminal of an antenna. The antenna is responsive to an electromagnetic wave. The resonance unit includes a first capacitor connected between the first terminal and the second terminal of the antenna. A matching unit is configured to perform impedance matching between the antenna and an NFC chip. The matching unit is connected between the first terminal and the second terminal of the antenna.

19 Claims, 17 Drawing Sheets

275

NEAR FIELD COMMUNICATION WITH MATCHING CIRCUITRY

CROSS-REFERENCE TO RELATED APPLICATION

This application claims priority under 35 USC §119 to Korean Patent Application No. 10-2013-0161772, filed on Dec. 23, 2013, in the Korean Intellectual Property Office (KIPO), the contents of which are herein incorporated by reference in their entirety.

BACKGROUND

1. Technical Field

Embodiments of the inventive concept described herein relate to near field communication (NFC). In particular, the inventive concepts relate NFC technology using matching devices.

2. Description of the Related Art

NFC technology is a type of wireless communication technology. Recent developments in NFC technology have resulted in NFC devices being used extensively in mobile devices.

NFC devices with matching circuitry perform communication by matching the resonance frequencies and impedances of the NFC devices. However, when such devices are employed in a mobile device, the size of the matching circuitry is larger than the NFC device itself.

SUMMARY

The present inventive concepts provide a matching circuit of an NFC device, embodiments of an NFC device and electronic systems capable of reduced occupied area.

In an aspect, a matching circuit of a near field communication (NFC0 device comprises a resonance unit connected between a first terminal and a second terminal of an antenna. The antenna is responsive to an electromagnetic wave. The resonance unit includes a first capacitor connected between the first terminal and the second terminal of the antenna. A matching unit is configured to perform impedance matching between the antenna and an NFC chip. The matching unit is connected between the first terminal and the second terminal of the antenna.

In some embodiments, the matching unit includes at least a second capacitor, which is capacitively coupled in parallel with the first capacitor. The first capacitor is replaced by two first replacement capacitors connected in series between the first terminal and the second terminal. Each first replacement capacitor has a same first replacement capacitance. A first replacement quality factor is less than a first quality factor of the first capacitor. Each first replacement capacitor has the first replacement capacitance substantially twice a first capacitance of the first capacitor.

In some embodiments, a resonance frequency provided by the resonance unit is substantially the same using the first capacitor as when the resonance unit uses the two first replacement capacitors.

In some embodiments, the resonance frequency is determined based on an inductance of the antenna and the first capacitance.

In some embodiments, the second capacitor is replaced by two second replacement capacitors connected in series. Each second replacement capacitor has a same second replacement capacitance. A second replacement quality factor is less than a second quality factor of the second capacitor. Each second replacement capacitor has the second replacement capacitance substantially twice a second capacitance of the second capacitor.

In some embodiments, a cut-off frequency provided by the matching unit is substantially the same using the second capacitor as when the resonance unit uses the two second replacement capacitors.

In some embodiments, a third capacitor is connected to the first capacitor at the first terminal of the antenna and connected to the second capacitor at a third node. A fourth capacitor is connected to the first capacitor at the second terminal of the antenna and connected to the second capacitor at a fourth node. A first inductor is connected between the third node and a first transmission terminal of the NFC chip. A second inductor is connected between the fourth node and a first transmission terminal of the NFC chip.

In some embodiments, the cut-off frequency is determined from capacitance values of the second capacitor, the third capacitor, and the fourth capacitor, and inductive values of the first inductor and the second inductor.

In some embodiments, each of the third capacitor and the fourth capacitor has a same third capacitance and the second capacitance is half of the third capacitance.

In an aspect, a near field communication (NFC) device comprises an antenna. A matching circuit is connected between a first terminal and a second terminal of the antenna. The matching circuit is configured to generate a field voltage in response to an electromagnetic field detected by the antenna. An NFC chip is configured to detect one of an NFC card and an NFC reader proximal to the NFC chip based on a magnitude of the field voltage, configured to operate in a reader mode when the NFC card is detected and configured to operate in a card mode when the NFC reader is detected. Wherein the matching circuit includes a second capacitor capacitively coupled in parallel with the antenna between the first terminal and second terminal, and the matching circuit is configured to substantially match an impedance of the antenna to an impedance of the NFC chip.

In some embodiments, the matching circuit further comprises a resonance unit including a first capacitor being connected in parallel with the antenna between the first and second terminals.

In some embodiments, the first capacitor is replaced by two first replacement capacitors connected in series. Each first replacement capacitor has a same first replacement capacitance. A first replacement quality factor is less than a first quality factor of the first capacitor. Each first replacement capacitor has the first replacement capacitance substantially twice a first capacitance of the first capacitor.

In some embodiments, a resonance frequency provided by the resonance unit is substantially the same using the first capacitor as when the resonance unit uses the two first replacement capacitors.

In some embodiments, the second capacitor is replaced by two second replacement capacitors connected in series. Each second replacement capacitor has a same second replacement capacitance. A second replacement quality factor is less than a second quality factor of the second capacitor. Each second replacement capacitor has the second replacement capacitance substantially twice a second capacitance of the second capacitor.

In some embodiments, a cut-off frequency provided by the matching unit is substantially the same using the second capacitor as when the resonance unit uses the two second replacement capacitors.

In some embodiments, the NFC chip is connected to the matching circuit through a reception terminal, a first transmission terminal, a second transmission terminal, a first power terminal and a second power terminal.

In some embodiments, the NFC chip transmits and receives through the first power terminal and second power terminal in the card mode, transmits through the first transmission and second transmission terminals in the card mode and receives through the reception terminal in the reader mode.

In some embodiments, the NFC chip receives the field voltage from the matching circuit through the first power terminal and second power terminal, and detects one of an NFC card and an NFC reader proximal to the NFC chip based on a magnitude of the field voltage.

In some embodiments, the NFC chip receives the field voltage from the matching circuit through the first transmission terminal and second transmission terminal, and detects one of an NFC card and an NFC reader proximal to the NFC chip based on a magnitude of the field voltage.

In some embodiments, the NFC chip comprises a transmission unit configured to provide a carrier signal to the matching circuit through a transmission terminal. A power generation unit is configured to generate an inner current and an inner voltage having a predetermined voltage level using a voltage provided from the matching circuit. A detection unit is configured to convert one of the magnitude of the field voltage and a magnitude of the inner current into a digital value. A tuning unit is configured to connect a capacitive load having a capacitance corresponding to a tuning control signal to the matching circuit. A central processing unit (CPU) is configured to control the transmission unit, the detection unit and the tuning unit, to detect the NFC card based on the digital value and a first threshold voltage, to detect the NFC reader based on the digital value and a second threshold voltage, to generate a first tuning control signal based on the digital value in the reader mode, and to generate a second tuning control signal based on the digital value in the card mode.

In some embodiments, the tuning unit connects the capacitive load between a terminal receiving the field voltage from the matching circuit and a ground voltage.

In some embodiments, the tuning unit connects the capacitive load between the transmission terminal and a ground voltage.

In an aspect an electronic system comprises a memory unit configured to store data. A near field communication (NFC) device is configured to transmit the data stored in the memory unit via an antenna in the NFC and to store in the memory unit data received via the antenna. An application processor is configured to control operations of the NFC device and the memory unit, Wherein the NFC device comprises a matching circuit, connected between a first terminal and a second terminal of the antenna, the matching unit configured to generate a field voltage in response to an electromagnetic field detected by the antenna. An NFC chip is configured to detect one of an NFC card and an NFC reader proximal to the NFC chip based on a magnitude of the field voltage, configured to operate in a reader mode when the NFC card is detected and configured to operate in a card mode when the NFC reader is detected. The matching circuit includes a second capacitor, which is capacitively coupled in parallel with the antenna between the first terminal and the second terminal. The matching circuit performs an impedance matching operation between the antenna and the NFC chip.

In some embodiments the matching circuit further comprises a resonance unit that includes a first capacitor connected in parallel with the antenna between the first terminal and the second terminal.

In some embodiments the second capacitor is replaced by two second replacement capacitors connected in series. Each second replacement capacitor has a same second replacement capacitance. A second replacement quality factor is less than a second quality factor of the second capacitor. Each second replacement capacitor has the second replacement capacitance substantially twice a second capacitance of the second capacitor.

In an aspect a near field communication (NFC) device comprises a matching circuit with variable impedance configured to substantially match an impedance of an antenna coupled thereto. A shielding member is configured to terminate electromagnetic energy radiating from a portable terminal attached thereto. The shielding member comprises an iron (Fe) element and a synthetic resin. A first coil is attached to the shielding member. A second coil is attached to the shielding member on a same plane as the first coil. The second coil concentrically surrounds the first coil and is separated from the first coil by a shielding wall. At least one of the first coil and the second coil form the antenna In some embodiments the synthetic resin is selected from a group consisting of Poly Carbonate (PC), Poly Amide (PA), Acrylonitrile-Butadiene-Styrene (ABS) copolymer and Nylon.

In some embodiments, at least one of the first coil and the second coil is formed by spirally winding enamel-insulated conductor wires.

In some embodiments, a protrusion from the shielding member comprises a paramagnetic material capable of aligning the protusion with a permanent magnet attached to a charging station.

In some embodiments the second coil is the antenna and the first coil is configured for one of a wireless charging and a wireless communication.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Figure 1:
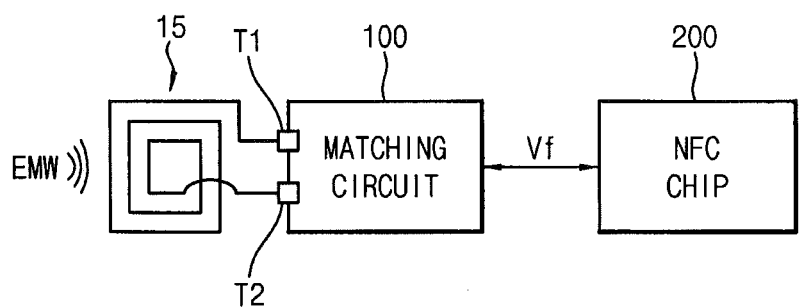
FIG. 1 is a block diagram illustrating a near filed communication (NFC) device according to some embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a near field communication (NFC) device according to some embodiments.

The NFC device 10 illustrated in FIG. 1 performs communication with an external device based on an NFC scheme. In a card mode, in which the NFC device 10 operates as a card, the NFC device 10 may transceive data with an external NFC reader based on an electromagnetic wave (EMW) provided from an NFC reader. In a reader mode, in which the NFC device 10 operates as a reader, the NFC device 10 may transceive data with an external NFC card based on an EMW provided from the NFC device 10.

Referring to FIG. 1, an NFC device 10 includes an antenna 15, a matching circuit 100 and an NFC chip 200.

The matching circuit 100 is connected to first and second terminals T1 and T2 of the antenna 15 which responds to the EMW and generates a corresponding field voltage (Vf) used by the NFC chip 200.

The NFC chip 200 detects whether an NFC card or an NFC reader exists around the NFC chip 200 based on a magnitude of Vf. When the NFC chip 200 detects an NFC card, the NFC chip 200 sets a resonance frequency of the matching circuit 100 as the first optimal frequency based on Vf and operates in the reader mode. When an NFC reader is detected, the NFC chip 200 sets the resonance frequency of the resonance unit 100 as the second optimal frequency based on at least one of the inner currents generated in response to the magnitude of Vf and the electromagnetic wave, and operates in the card mode.

Figure 2:
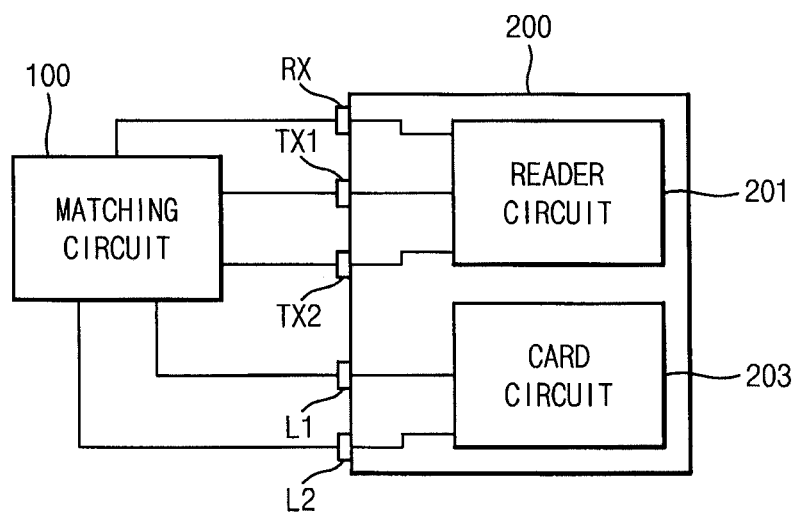
FIG. 2 illustrates the connectivity between the matching circuit and the NFC chip am the NFC device of FIG. 1.

FIG. 2 illustrates a connection relationship between the matching circuit and the NFC chip in the NFC device of FIG. 1.

Referring to FIG. 2, the NFC chip 200 includes a reader circuit 201 and a card circuit 203. The matching circuit 100 is connected to the reader circuit 201 of the NFC chip 200 via a reception terminal RX terminal and first and second transmission terminals TX1 and TX2. The matching circuit 100 is further connected to the card circuit 203 of the NFC chip 200 via first and second power terminals L1 and L2.

Figure 3:
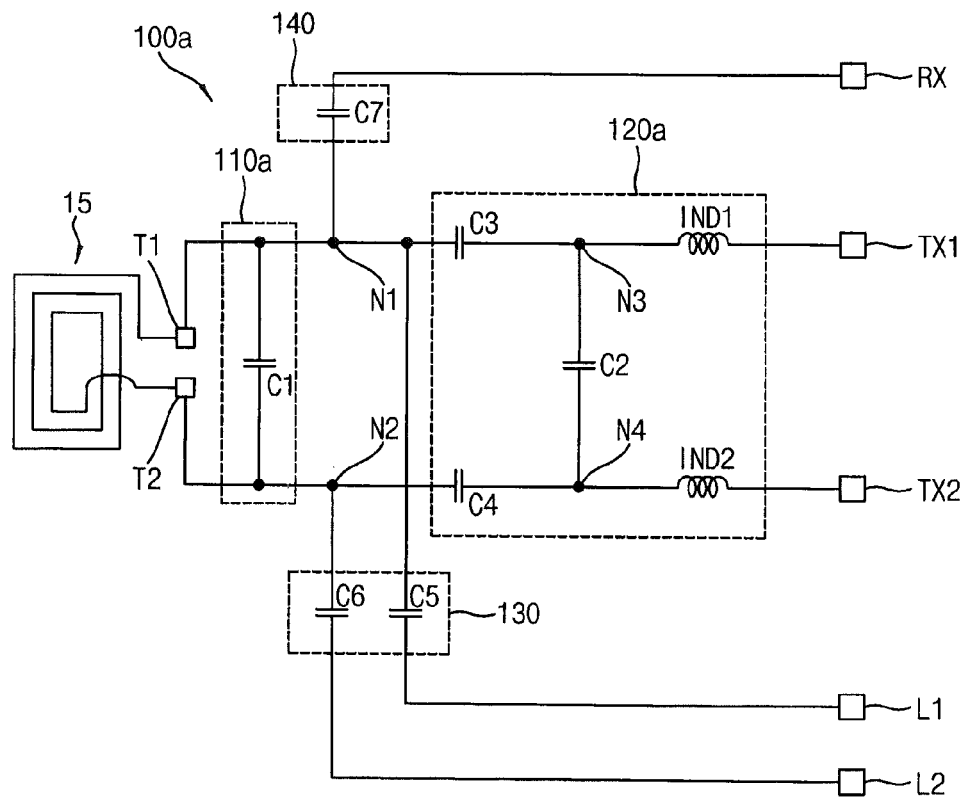
FIG. 3 is a circuit diagram illustrating an example of the matching circuit in FIG. 1 according to some embodiments.

FIG. 3 is a circuit diagram illustrating an example of the matching circuit in FIG. 1 according to some embodiments.

In FIG. 3, the antenna 15 is illustrated along with a matching circuit 100a.

Referring to FIG. 3, the matching circuit 100a may include a resonance unit 110a and a matching unit 120a. The matching circuit 100a may further include first and second filters 130 and 140 respectively.

In an embodiment, the matching circuit 100 may include one of the resonance unit 110a and the matching unit 120a.

The resonance unit 110a may include a first capacitor C1 as a single device, which is connected in parallel with the antenna 15 between the first and second terminals T1 and T2 of the antenna 15. The first capacitor C1 is connected between the first terminal T1 at a first node N1 and the second terminal T2 at a second node N2.

The matching unit 120a may include second through fourth capacitors C2, C3 and C4 and first and second inductors IND1 and IND2 respectively. The second capacitor C2 is connected to nodes N3 and N4 and is coupled to the first capacitor C1 through the third capacitor C3 and the fourth capacitor C4. The third capacitor C3 is connected between the first node N1 and a third node N3. The fourth capacitor C4 is connected between the second node N2 and the fourth node N4.

The first inductor IND1 is connected between the third node N3 and the first transmission terminal TX1. The second inductor IND2 is connected between the fourth node N4 and the second transmission terminal TX2.

The first capacitor C1 of the resonance unit 110a and the second capacitor C2 of the matching unit 120a are AC coupled in parallel with respect to the antenna 15. The third and the fourth capacitors C3 and C4 of the matching unit 120a are connected in series to the antenna 15.

The first filter 130 includes a fifth capacitor C5 connected between the first node N1 and the first power terminal L1. A sixth capacitor C6 is connected between the second node N2 and the second power terminal L2. The second filter 140 includes a seventh capacitor C7 connected between the first node N1 and the reception terminal RX.

The first capacitor C1 may have a first capacitance, the second capacitor C2 may have a second capacitance equal in capacitive value to the first capacitance. Each of the third and fourth capacitors C3 and C4 respectively, may have a same third capacitance and the third capacitance may have twice the capacitive value of the second capacitance. The first and second capacitors C1 and C2 respectively, may be implemented by a device having a high quality factor.

Figure 4:
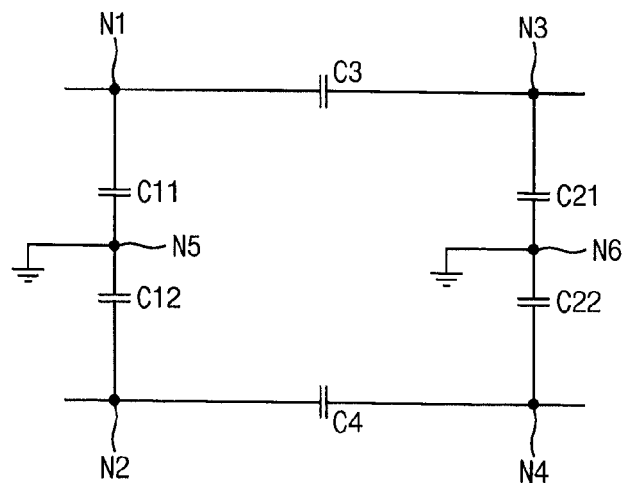
FIG. 4 illustrates an example to be compared with the matching circuit of FIG. 3.

FIG. 4 illustrates an example to be compared with the matching circuit of FIG. 3.

In FIG. 4, it is assumed that the first capacitor C1 of the resonance unit 110a in FIG. 3 is replaced by two replacement capacitors C11 and C12 which are connected in series between the first and second nodes N1 and N2 respectively, and the second capacitor C2 of the matching unit 120a is replaced by two replacement capacitors C21 and C22 which are connected in series between the third and fourth nodes N3 and N4 respectively.

Referring to FIG. 4, the replacement capacitors C11 and C12 are connected in series between the first node N1 and second node N2, and further connected to a ground voltage at node N5. In addition, the replacement capacitors C21 and C12 are connected in series between the third node N3 and fourth node N4, and are further connected to the ground voltage at node N6.

Each of the replacement capacitors C11 and C12 has a same first replacement capacitance and the first replacement capacitance may have twice the capacitive value of the first capacitor C1. Each of the replacement capacitors C21 and C22 has a same second replacement capacitance and the second replacement capacitance may have twice the capacitive value of the second capacitance of the second capacitor C2. A first quality factor of the first capacitor C1 may be higher than each quality factor of the replacement capacitors C11 and C12, and a second quality factor of the second capacitor C2 may be higher than each quality factor of the replacement capacitors C21 and C22.

A resonance frequency provided by an inductance of the antenna 15 and the first capacitance of the first capacitor C1 in the matching circuit 100a of FIG. 3 is substantially the same as a resonance frequency provided by the inductance of the antenna 15 and the capacitances of the replacements capacitors C11 and C12 in FIG. 4. In addition, because the first capacitance of the first capacitor C1 is a half of the first replacement capacitance of each of the replacement capacitors C11 and C12, a size of the first capacitor C1 may be half of each size of the replacement capacitors C11 and C12. In addition, a cutoff frequency provided by the matching unit 120a including the second capacitor C2 in FIG. 3 is substantially the same as a cutoff frequency provided by a matching unit including the replacement capacitors C21 and C22 in FIG. 4. Because the second capacitance of the second capacitor C2 is a half of the second replacement capacitance of each of the replacement capacitors C21 and C22, a size of the second capacitor C2 may be half of each size of the replacement capacitors C21 and C22. Therefore, the matching circuit 100a may reduce occupied area greatly, may reduce cost and may reduce a number of devices to minimize errors due to the devices when it is compared with a case in which the first capacitor C1 of the resonance unit 110a is replaced by the replacement capacitors C11 and C12, and the second capacitor C2 of the matching unit 120a is replaced by the replacement capacitors C21 and C22. In addition, because the first and second capacitors C1 and C2 may have high quality factors, the matching circuit 100a with a smaller occupied area may provide same resonance frequency and cutoff frequency as comparing example of FIG. 4.

Figure 5:
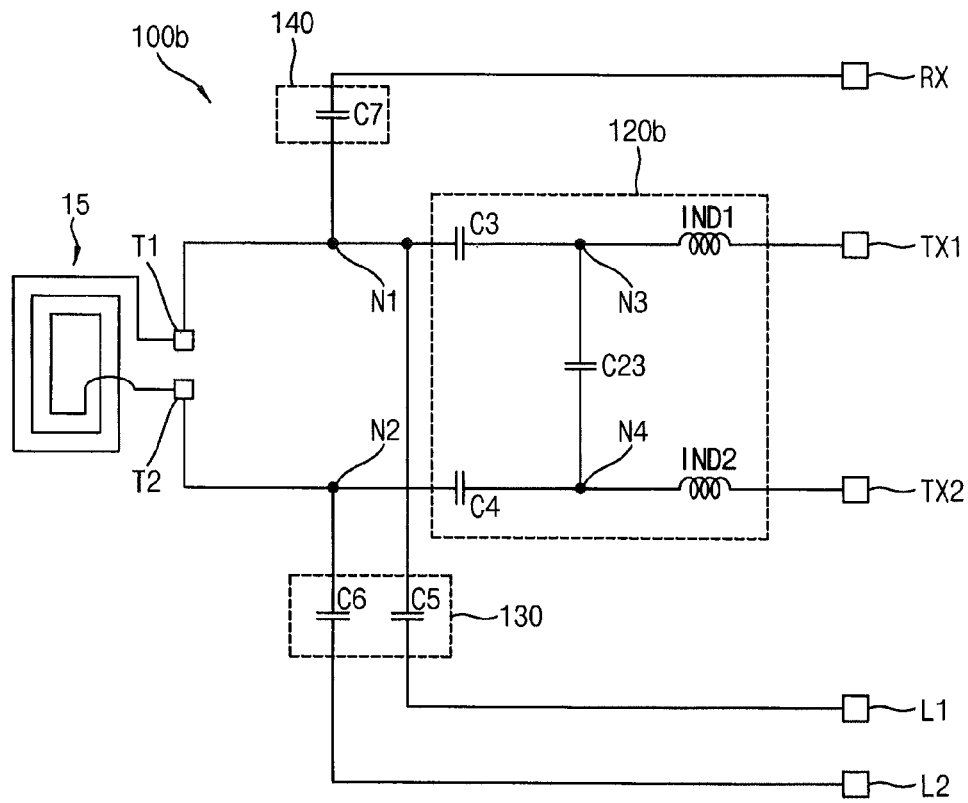
FIG. 5 is a circuit diagram illustrating an example of the matching circuit in FIG. 1 according to some embodiments.

FIG. 5 is a circuit diagram illustrating an example of the matching circuit in FIG. 1 according to some embodiments.

In FIG. 5, the antenna 15 is illustrated along with a matching circuit 100b.

Referring to FIG. 5, the matching circuit 100b may include a matching unit 120b. The matching circuit 100b may further include first and second filters 130 and 140 respectively.

The matching unit 120b may include second C23, third C3 and fourth C4 capacitors, and first and second inductors IND1 and IND2 respectively. The second capacitor C23 is connected to nodes N3 and N4 and is coupled to the first capacitor C1 through the third capacitor C3 and the fourth capacitor C4. The third capacitor C3 is connected between the first node N1 and third node N3. The fourth capacitor C4 is connected between second node N2 and fourth node N4. The first inductor IND1 is connected between the third node N3 and the first transmission terminal TX1. The second inductor IND2 is connected between the fourth node N4 and the second transmission terminal TX2.

The third and the fourth capacitors C3 and C4 of the matching unit 120b are connected in series to the antenna 15. The first filter 130 includes a fifth capacitor C5 connected between the first node N1 and the first power terminal L1. The sixth capacitor C6 is connected between the second node N2 and the second power terminal L2. The second filter 140 includes a seventh capacitor C7 connected between the first node N1 and the reception terminal RX.

The second capacitor C23 may have a second capacitance. Each of the third and fourth capacitors C3 and C4 may have a same third capacitance and the third capacitance may be twice the capacitive value of the second capacitance. The second capacitor C23 may be implemented by a device having a high quality factor.

Figure 6:
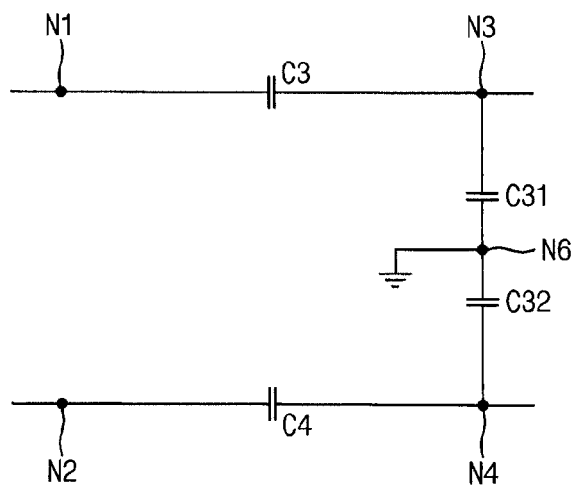
FIG. 6 illustrates an example to be compared with the matching circuit of FIG. 5.

FIG. 6 illustrates an example to be compared with the matching circuit of FIG. 5.

In FIG. 6, it is assumed that the second capacitor C23 of the matching unit 120b is replaced by two replacement capacitors C31 and C32 which are connected in series between the third node N3 and fourth node N4.

Referring to FIG. 6, the replacement capacitors C31 and C32 are connected in series between the third and fourth nodes N3 and N4 respectively, and are connected to the ground voltage at node N6. Each of the replacement capacitors C31 and C32 has a same replacement capacitance and the replacement capacitance may be twice the capacitive value of the second capacitor C23. A quality factor of the second capacitor C23 may be higher than each quality factor of the replacement capacitors C31 and C32.

In addition, a cutoff frequency provided by the matching unit 120b including the second capacitor C23 in FIG. 5 is substantially same as a cutoff frequency provided by a matching unit including the replacement capacitors C31 and C32 in FIG. 6. Because the second capacitance of the second capacitor C23 is a half of the replacement capacitance of each of the replacement capacitors C31 and C32, a size of the second capacitor C23 may be half of each size of the replacement capacitors C31 and C32. Therefore, the matching circuit 100b may reduce occupied area greatly, may reduce cost and may reduce a number of devices to minimize errors due to the devices when it is compared with a case in which the second capacitor C23 of the matching unit 120b is replaced by the replacement capacitors C31 and C32. In addition, because the second capacitor C23 may have a high quality factor, the matching circuit 100b with a smaller occupied area may provide same resonance frequency and cutoff frequency as comparing example of FIG. 6.

Figure 7:
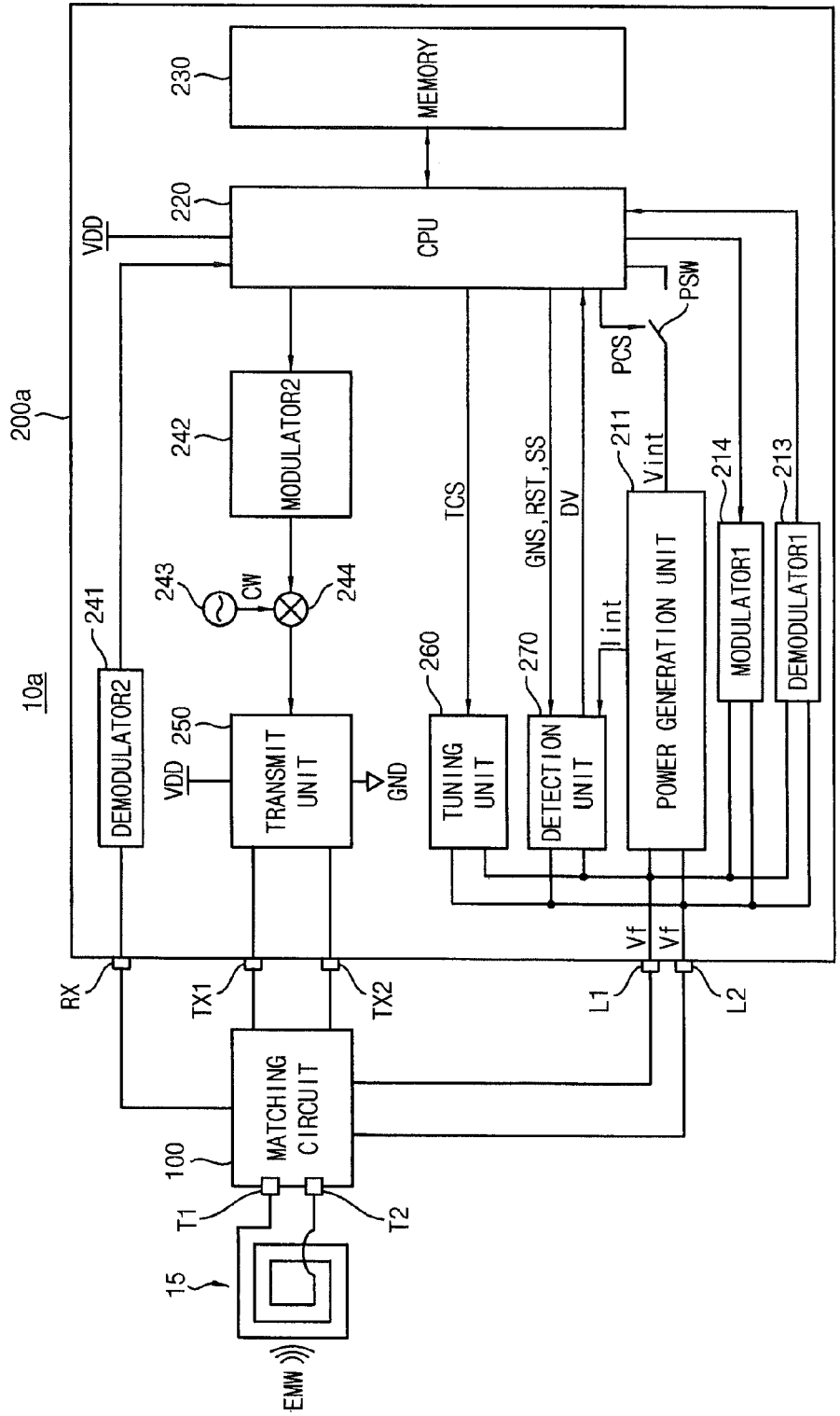
FIG. 7 is a block diagram illustrating an example of the NFC device in FIG. 1 according to some embodiments.

FIG. 7 is a block diagram illustrating an example of the NFC device in FIG. 1 according to some embodiments.

Referring to FIG. 7, an NFC device 10a may include the antenna 15, the matching circuit 100 and an NFC chip 200a.

The matching circuit 100 may employ the matching circuit 100a of FIG. 3 or the matching circuit 100b of FIG. 5 and may include the first and second capacitors C1 and C2 or the second capacitor C23 as single device, either being connected in parallel with the antenna 15 between the first terminal T1 and second terminal T2 of the antenna 15. Therefore, the matching circuit 100 may provide the same resonance frequency and cutoff frequency of the matching circuits of FIG. 4 or FIG. 6 while reducing occupied area, cost and device errors. The matching circuit 100 generates the field voltage Vf in response to the EMW and provides the field voltage Vf to the NFC chip 200a.

The NFC chip 200a may be connected to the matching circuit 100 through the first power terminal L1 and second power terminal L2, the first transmission terminal TX1 and second transmission terminal TX2, and a reception terminal RX.

The NFC chip 200a may perform transmission and reception operations through the first power terminal L1 and second power terminal L2 in the card mode. The NFC chip 200a may perform a transmission operation through the first transmit terminal TX1 and second transmit terminal TX2, and a reception operation through the reception terminal RX in the reader mode.

The NFC chip 200a included in the NFC device 10a of FIG. 7 may receive the field voltage Vf from the matching circuit through the first and second power terminals L1 and L2 respectively.

The NFC chip 200a may include a power generation unit 211, first and second demodulators 213 and 241, first and second modulators 214 and 242 respectively, a central processing unit 220, a power switch (PSW), a memory 230, an oscillator 243, a mixer 244, a transmission unit 250, a tuning unit 260 and a detection unit 270.

The power generation unit 211 may generate an inner current Iint and an inner voltage Vint having a desired voltage level using a voltage provided through the first and second power terminals L1 and L2 respectively from the matching circuit 100.

Figure 8:
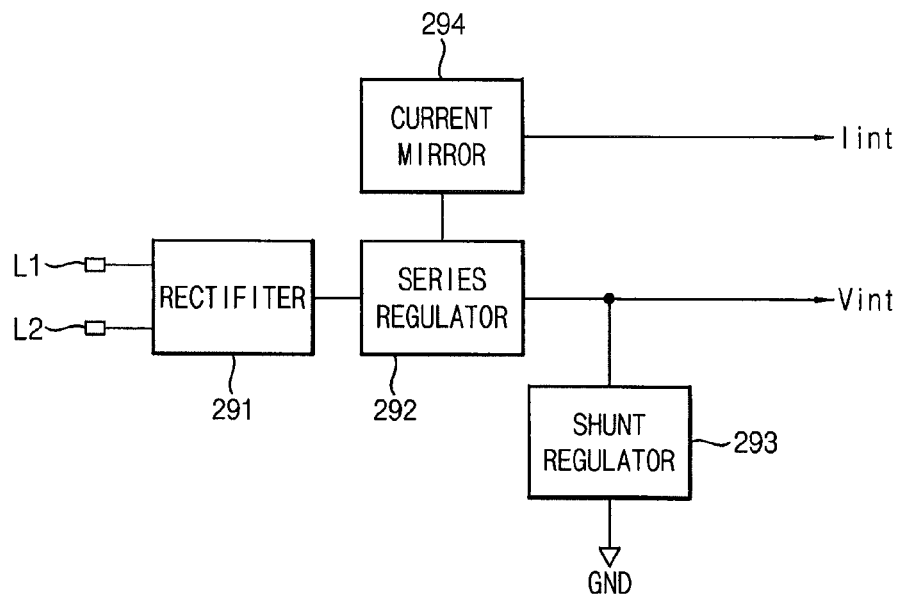
FIG. 8 is a block diagram illustrating an example of the power generation unit in the NFC device of FIG. 7.

FIG. 8 is a block diagram illustrating an example of the power generation unit in the NFC device of FIG. 7.

Referring to FIG. 8, the power generation unit 211a may include a rectifier 291, a series regulator 292, a shunt regulator 293 and a current mirror 294.

The rectifier 291 may generate a rectified voltage by rectifying the voltage provided from the matching circuit 100 through the first and second power terminals L1 and L2. The series regulator 292 may be connected to an output terminal of the rectifier 291 and the shunt regulator 293 may be connected between an output terminal of the series regulator 292 and a ground voltage. Thus, the series regulator 292 and shunt regulator 293 may generate the inner voltage Vint having the desired voltage level Vint which is usable in the NFC chip 200a through the output terminal of the series regulator 292 by using the rectified voltage.

The current mirror 294 may generate the inner current Iint having an intensity which is proportional to that of a current flowing through the series regulator 292.

Figure 9:
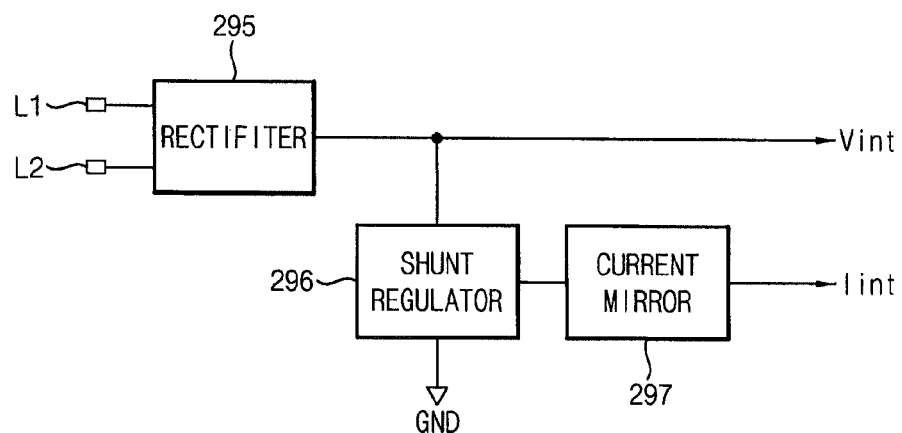
FIG. 9 is a block diagram illustrating another example of the power generation unit the NFC device of FIG. 7.

FIG. 9 is a block diagram illustrating another example of the power generation unit the NFC device of FIG. 7.

Referring to FIG. 9, the power generation unit 211b may include a rectifier 295, a shunt regulator 296 and a current mirror 297.

The rectifier 295 may generate a rectified voltage by rectifying a voltage provided through the first and second power terminals L1 and L2 respectively from the matching circuit 100. The shunt regulator 296 may be connected between an output terminal of the rectifier 295 and the ground voltage. Thus, the shunt regulator 296 may generate the inner voltage Vint having a desired voltage level which is usable in the NFC chip 200a through an output terminal of the rectifier 295 by using the rectified voltage.

The current mirror 297 may generate the inner current Iint having a value which is proportional to that of a current flowing through the shunt regulator 296.

Referring back to FIG. 7, the CPU 220 may control overall operations of the NFC chip 200a. The CPU 220 may operate by receiving a power supply voltage VDD from a power source unit such as a battery. Further, the CPU 220 may receive the inner voltage Vint through the power switch PSW from the power generation unit 211. When the power source voltage VDD has a desired level or above, the CPU 220 may operate using the power source voltage VDD and may allow a power control signal PCS to be disabled such that the power switch PSW may be turned off. Meanwhile, when the power supply voltage VDD has the desired level or below, the CPU 220 allows the power control signal PCS to be enabled such that the power switch PSW is turned on, so the CPU 220 may operate by using the inner voltage Vint provided from the power generation unit 211.

When a reception operation is performed in the card mode, the first demodulator 213 may demodulate a signal provided through the first and second power terminals L1 and L2 from the matching circuit 100 to generate input data and may provide the input data to the CPU 220. The CPU 220 may store the input data in the memory 230.

When a transmission operation is performed in the card mode, the CPU 220 may read output data from the memory 230 to provide the output data to the first modulator 214. The first modulator 214 may modulate the output data to provide a modulated signal to the first and second power terminals L1 and L2 respectively. For example, the modulator 214 may perform a load modulation for the output data to generate the modulated signal.

When a reception operation is performed in the reader mode, the second demodulator 241 may demodulate a signal provided through the reception terminal RX from the matching circuit (e.g. resonance unit) 100 to generate input data and may provide the input data to the CPU 220. The CPU 220 may store the input data in the memory 230.

When a transmission operation is performed in the reader mode, the CPU 220 may read out output data from the memory 230 to provide the output data to the second modulator 242. The second modulator 242 may modulate the output data to generate a modulated signal. In addition, the oscillator 243 may generate a carrier signal (CW) having a frequency corresponding to a carrier frequency (for example, 13.56 MHz), and the mixer 244 may combine the carrier signal CW with the modulated signal to generate a transmission signal.

In the reader mode, the transmission unit 250 may provide the transmission signal provided from the mixer 244 to the matching circuit 100 through the first and second transmission terminals TX1 and TX2 respectively. The matching circuit 100 may radiate an electromagnetic wave EMW corresponding to the transmission signal. For example, the transmit unit 250 is connected between the power supply voltage VDD and the ground voltage GND. In the reader mode, the transmit unit 250 may allow the first and second transmission terminals TX1 and TX2 respectively to be connected to either the power supply voltage VDD through a pull-up load or the ground voltage GND through pull-down load based on the transmission signal, so that the transmission signal may be provided to the matching circuit 100 through the first and second transmission terminals TX1 and TX2 respectively.

During the time interval while detecting whether an NFC card exists and while the output data are not transmitted in the reader mode, the CPU 220 does not provide the output data to the second modulator 242. Accordingly, the transmission signal provided by the transmission unit 250 through the first and second transmission terminals TX1 and TX2 respectively may be substantially identical to the carrier signal CW.

The tuning unit 260 may connect to a capacitive load, which has a capacitance corresponding to a tuning control signal (TCS) provided from the CPU 220, to the matching circuit 100 through the first and second power terminals L1 and L2 respectively.

Figure 10:
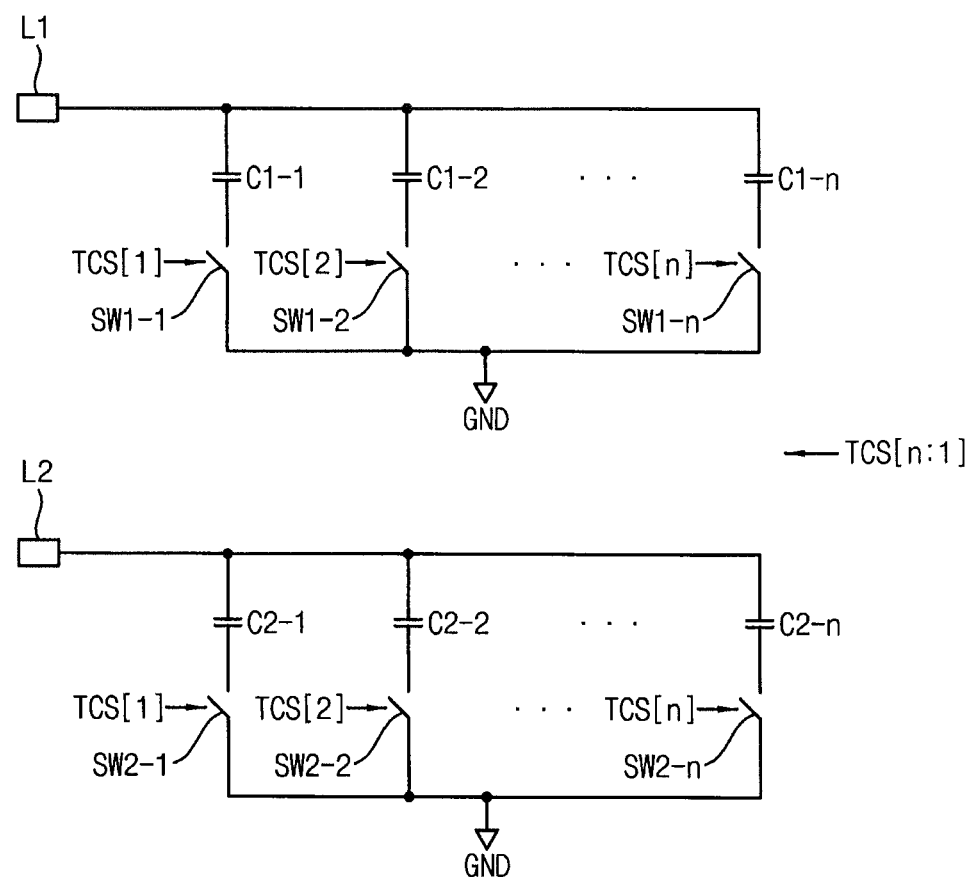
FIG. 10 is a block diagram illustrating an example of the tuning unit in the NFC device of FIG. 7.

FIG. 10 is a block diagram illustrating an example of the tuning unit in the NFC device of FIG. 7.

Referring to FIG. 10, the tuning unit 260 may include $(1\text{-}1)^{TH}$ to $(1\text{-}n)^{TH}$ capacitors C1-1, C1-2 through C1-$n$, $(1\text{-}1)^{TH}$ to $(1\text{-}n)^{TH}$ switches SW1-1, SW1-2 through SW1-$n$, $(2\text{-}1)^{TH}$ to $(2\text{-}n)^{TH}$ capacitors C2-1, C2-2 through C2-$n$, and $(2\text{-}1)^{TH}$ to $(2\text{-}n)^{TH}$ switches SW2-1, SW2-2 through SW2-$n$, wherein n is an integer of 2 or more.

The $(1\text{-}1)^{TH}$ to $(1\text{-}n)^{TH}$ switches SW1-1, SW1-2 through SW1-$n$ may be connected in series to the $(1\text{-}1)^{TH}$ to $(1\text{-}n)^{TH}$ capacitors C1-1, C1-2 through C1-$n$, respectively. The $(2\text{-}1)^{TH}$ to $(2\text{-}n)^{TH}$ switches SW2-1, SW2-2 through SW2-$n$ may be connected in series to the $(2\text{-}1)^{TH}$ to $(2\text{-}n)^{TH}$ capacitors C2-1, C2-2 through C2-$n$, respectively. The $(1\text{-}1)^{TH}$ to $(1\text{-}n)^{TH}$ capacitors C1-1, C1-2 through C1-$n$ and the $(1\text{-}1)^{TH}$ to $(1\text{-}n)^{TH}$ switches SW1-1, SW1-2 through SW1-$n$ may be connected in parallel between the first power terminal L1 and the ground voltage GND. The $(2\text{-}1)^{TH}$ to $(2\text{-}n)^{TH}$ capacitors C2-1, C2-2 through C2-$n$ and the $(2\text{-}1)^{TH}$ to $(2\text{-}n)^{TH}$ switches SW2-1, SW2-2 through SW2-$n$ may be connected in parallel between the second power terminal L2 and the ground voltage GND.

The tuning control signal (TCS) provided from the CPU 220 may be an n-bit wide signal. Each bit included in the tuning control signal TCS may control the $(1\text{-}1)^{TH}$ to $(1\text{-}n)^{TH}$ switches SW1-1, SW1-2 through SW1-$n$ and the $(2\text{-}1)^{TH}$ to $(2\text{-}n)^{TH}$ switches SW2-1, SW2-2 through SW2-$n$. For example, a first bit TCS[1] of the tuning control signal may control the $(1\text{-}1)^{TH}$ switch SW1-1 and the $(2\text{-}1)^{TH}$ switch SW2-1. The second bit TCS[2] of the tuning control signal may control the $(1\text{-}2)^{TH}$ switch SW1-2 and the $(2\text{-}2)^{TH}$ switch SW2-1. The $n^{TH}$ bit TCS[n] of the tuning control signal may control the $(1\text{-}n)^{TH}$ switch SW1-$n$ and the $(2\text{-}n)^{TH}$ switch SW2-$n$.

As described above, because the capacitances of the capacitive loads of the tuning unit 260, which are connected between the first power terminal L1 and the ground voltage GND and between the second power terminal L2 and the ground voltage GND, are determined based on the tuning control signal TCS, the resonance frequency of the matching circuit 100 may vary by varying the tuning control signal TCS.

Referring FIG. 7, the detection unit 270 is connected to the first and second power terminals L1 and L2 respectively. The detection unit 270 may convert one of the inner current Ent provided from the power generation unit 211 and the field voltage Vf received through the first and second power terminals L1 and L2 respectively into a digital value (DV) based on control signals provided from the CPU 220, and may provide the digital value DV to the CPU 220.

Figure 11:
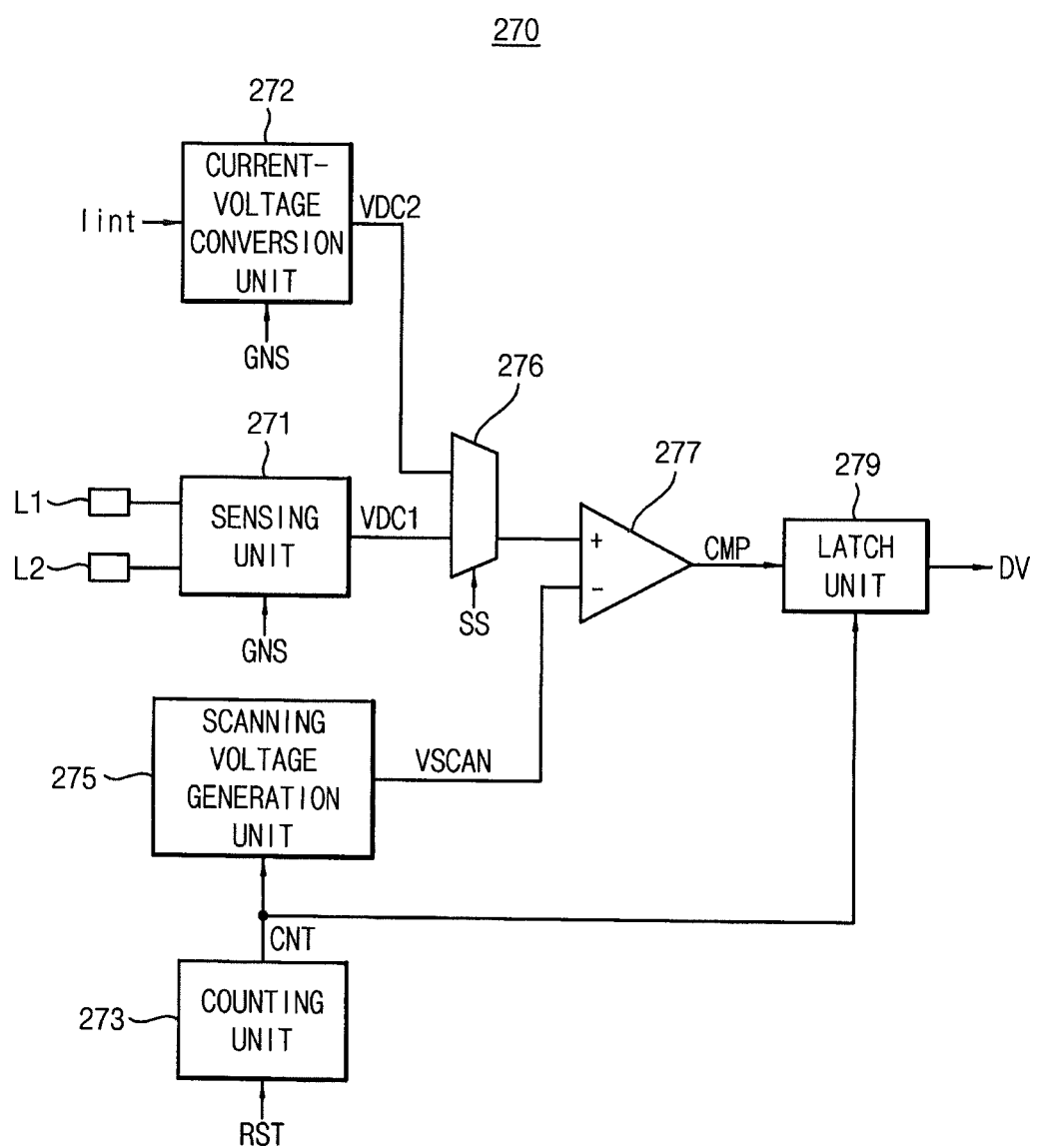
FIG. 11 is a block diagram illustrating an example of the detection unit included in the NFC device of FIG. 7.

FIG. 11 is a block diagram illustrating an example of the detection unit included in the NFC device of FIG. 7.

Referring to FIG. 11, the detection unit 270 may include a sensing unit 271, a current-voltage conversion unit 272, a counting unit 273, a scanning voltage generation unit 275, a multiplexer 276, a comparator 277 and a latch unit 279.

The sensing unit 271 may convert the field voltage provided through the first and second power terminals L1 and L2 respectively into a first DC voltage VDC1. For example, the sensing unit 271 may generate the first DC voltage VDC1 which is proportional to a magnitude of the field voltage Vf and a gain signal (GNS) provided from the CPU 220.

When detecting whether an NFC card exists and is in the reader mode, the transmission unit 250 provides the transmission signal including the carrier signal CW to the matching circuit 100 through first and second transmission terminals TX1 and TX2 respectively. In contrast, when detecting whether an NFC reader exists in the card mode, the transmission unit 250 does not generate the transmission signal. Thus, the magnitude of the field voltage Vf provided to the sensing unit 271 when detecting whether an NFC card exists in the reader mode may be relatively greater than that of the field voltage Vf provided to the sensing unit 271 when detecting whether an NFC reader exists in the card mode. Therefore, the CPU 220 provides the gain signal GNS having a first value to the sensing unit 271 when detecting whether an NFC card exists and is in the reader mode and provides the gain signal GNS having a second value greater than the first value to the sensing unit 271 when detecting whether an NFC reader exists and is in the card mode, so that the sensing unit 271 may generate the first DC voltage VDC1 having a magnitude in a predetermined range regardless of the operation modes.

Figure 12:
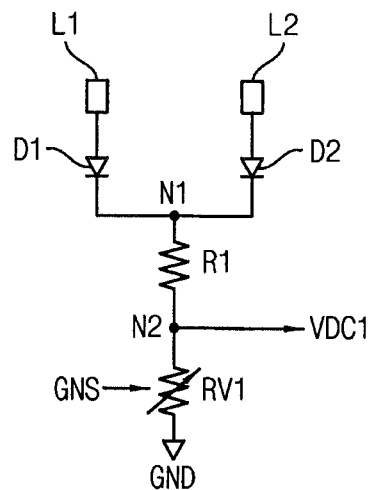
FIG. 12 is a block diagram illustrating an example of the sensing unit included in the detection unit of FIG. 11.

FIG. 12 is a block diagram illustrating an example of the sensing unit included in the detection unit of FIG. 11.

Referring to FIG. 12, the sensing unit 271a may include a rectifier circuit including first and second diodes D1 and D2 respectively, a first resistor R1 and a first variable resistor RV1.

The anode of the first diode D1 may be connected to the first power terminal L1 and the cathode connected to a first node N1. The anode of the second diode D2 may be connected to the second power terminal L2 and the cathode connected to the first node N1. Thus, the rectifier circuit may rectify the field voltage Vf to output a rectified voltage to the first node N1.

The first resistor R1 may be connected between the first node N1 and second nodes N2, and the first variable resistor RV1 may be connected between the second node N2 and the ground voltage GND. The first variable resistor RV1 may have a resistance value having a magnitude corresponding to the gain signal GNS.

Because the first resistor R1 and the first variable resistor RV1 are operated as a voltage dividing circuit for dividing the rectified voltage, the sensing unit 271a may convert the field voltage Vf into the first DC voltage VDC1 based on the gain signal GNS and may output the first DC voltage VDC1 through the second node N2.

Figure 13:
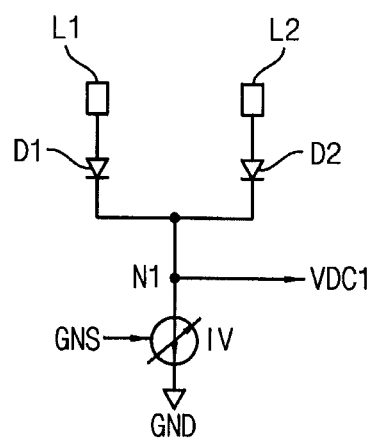
FIG. 13 is a block diagram illustrating another example of the sensing unit in the detection unit of FIG. 11.

FIG. 13 is a block diagram illustrating another example of the sensing unit in the detection unit of FIG. 11.

Referring to FIG. 13, the sensing unit 271b may include a rectifier circuit including first and second diodes D1 and D2 respectively, and a variable current source IV.

The anode of the first diode D1 may be connected to the first power terminal L1 and the cathode connected to a first node N1. The anode of the second diode D2 may be connected to the second power terminal L2 and the cathode connected to the first node N1. Thus, the rectifier circuit may rectify the field voltage Vf to output a rectified voltage to the first node N1.

The variable current source IV may be connected between the first node N1 and the ground voltage GND. The variable current source IV may generate a current having an intensity corresponding to the gain signal GNS.

Since a magnitude of the rectified voltage may vary according to an intensity of the current generated from the variable current source IV, the sensing unit 271b may convert the field voltage Vf into the first DC voltage VDC1 based on the gain signal GNS to output the first DC voltage VDC1 through the first node N1.

Referring to FIG. 11, the current-voltage conversion unit 272 may convert the inner current Iint provided from the power generation unit 211 into the second DC voltage VDC2. For example, the current-voltage conversion unit 272 may generate the second DC voltage VDC2 proportional to an intensity of the inner current Iint and the gain signal GNS provided from the CPU 220. As described above, the CPU 220 provides the gain signal GNS having the first value to the current-voltage conversion unit 272 when detecting whether an NFC card exists and is in the reader mode, and the gain signal GNS having the second value greater than the first value to the current-voltage conversion unit 272 when detecting whether an NFC reader exists and is in the card mode. Accordingly, the current-voltage conversion unit 272 may generate the second DC voltage VDC2 having a magnitude in a predetermined range regardless of the operation modes.

The multiplexer 276 may output one of the first and second DC voltages VDC1 and VDC2 respectively in response to a selection signal SS provided from the CPU 220. For example, when the selection signal SS has a first logic level, the multiplexer 276 may output the first DC voltage VDC1. when the selection signal SS has a second logic level, the multiplexer 276 may output the second DC voltage VDC2. In one example embodiment, the CPU 200 may output the selection signal SS having the first logic level in the reader mode and may determine the logic level of the selection signal SS based on an intensity of an electromagnetic wave received from the NFC reader in the card mode. In another example embodiment, the CPU 200 may determine the logic level of the selection signal SS based on a user selection.

The counting unit 273 may generate a counting value CNT by performing an up-counting operation and may reset the counting value CNT in response to a reset signal RST provided from the CPU 220.

The scanning voltage generation unit 275 may generate a scanning voltage VSCAN which is gradually increased based on the counting value CNT.

Figure 14:
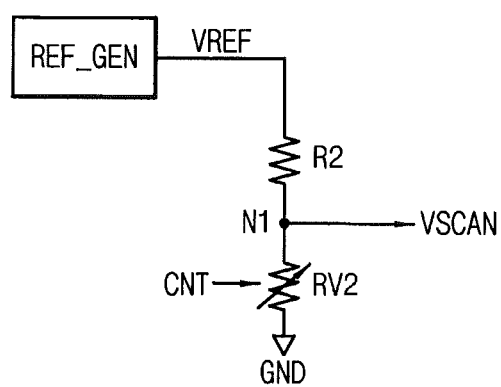
FIG. 14 is a block diagram illustrating an example of the scanning voltage generation unit in the detection unit of FIG. 11.

FIG. 14 is a block diagram illustrating an example of the scanning voltage generation unit in the detection unit of FIG. 11.

Referring to FIG. 14, the scanning voltage generation unit 275 may include a reference voltage generator REF_GEN, a second resistor R2 and a second variable resistor RV2.

The reference voltage generator (REF_GEN) may generate a reference voltage VREF having a predetermined magnitude. In one example, the reference voltage generator is a bandgap reference.

The second resistor R2 may be connected between the reference voltage generator REF_GEN and the first node N1. The second variable resistor RV2 may be connected between the first node N1 and the ground voltage GND. The second variable resistor RV2 may have a resistance value corresponding to the counting value CNT.

Because the second resistor R2 and the second variable resistor RV2 are operated as a voltage dividing circuit for dividing the reference voltage VREF, the scanning voltage generation unit 275 may generate the scanning voltage VSCAN having a magnitude proportional to the counting value CNT, and output the scanning voltage VSCAN at the first node N1.

Further, because the scanning voltage generation unit 275 controls a rate of increasing a resistance value of the second variable resistor RV2 in proportion to the counting value CNT, the detection unit 270 may control an accuracy of converting the field voltage Vf received through the first and second power terminals L1 and L2 respectively, or the inner current Iint provided through the power generation unit 211 into the digital value DV.

Referring to FIG. 11, by comparing the output voltage of the multiplexer 276 with the scanning voltage VSCAN provided from the scanning voltage generation unit 275, the multiplexer 276 may output a comparison signal CMP which has the first logic level when the output voltage of the multiplexer 276 is higher than the scanning voltage VSCAN, or the second logic level when the output voltage of the multiplexer 276 is lower than the scanning voltage VSCAN.

Because the scanning voltage VSCAN is progressively increased, the comparator 277 may allow the comparison signal CMP to transition (e.g. switch) from the first logic level to the second logic level when the magnitude of the scanning voltage VSCAN is equal to or greater than that of the output voltage of the multiplexer 276 while the comparator 277 is outputting the comparison signal CMP of the first logic level. In one example, the comparator 277 includes hysteresis to prevent transient CMP behavior when the inputs to the comparator 277 are substantially equal in value.

The latch unit 279 may receive the counting value CNT and the comparison signal CMP, latch the counting value CNT in response to the transition of the comparison signal CMP and output the latched counting value CNT as the digital value DV.

Referring to FIG. 7, the CPU 220 may detect an NFC card by comparing the digital value DV with the first threshold voltage and may detect an NFC reader by comparing the digital value DV with the second threshold voltage. Further, the CPU 220 may generate the tuning control signal TCS corresponding to the first optimal frequency based on the digital value DV and may provide the tuning control signal TCS to the tuning unit 260 in the reader mode. In addition, the CPU 220 may generate the tuning control signal TCS corresponding to the second optimal frequency based on the digital value DV and may provide the tuning control signal TCS to the tuning unit 260 in the card mode.

Hereinafter an operation of the NFC device 10*a* will be described in detail with reference to FIG. 7.

If the NFC device 10*a* is turned on, the NFC device 10*a* may perform repeatedly and alternately the operation of detecting an NFC card and the operation of detecting an NFC reader until the NFC card or NFC reader is detected.

The transmission unit 250 may periodically provide the carrier signal CW having a standard voltage to the matching circuit 100 in order to detect an NFC card and the matching circuit 100 may periodically radiate the carrier wave corresponding to the carrier signal CW. The CPU 220 may output the selection signal SS having the first logic level and the detection unit 270 may receive the field voltage Vf generated at the first and second power terminals L1 and L2 respectively while radiating the carrier wave to generate the digital value DV.

When the NFC card is not present near the NFC device 10*a*, the carrier wave radiated through the matching circuit 100 is not returned because the carrier wave is not reflected from an NFC card. Accordingly the field voltage Vf generated at the first and second power terminals L1 and L2 respectively may be substantially equal to the standard voltage. However when an NFC card is placed near the NFC device 10*a* at time t1, because the carrier wave returns from the NFC card due to the reflection from the NFC card, the field voltage Vf generated at the first power terminal L1 and the second power terminal L2 may be lower than the standard voltage.

Thus, when the voltage corresponding to the digital value DV is lower than the standard voltage by the first threshold voltage or more, the CPU 220 may determine that the NFC card is detected (e.g. is in close proximity to the NFC device).

When the NFC card is detected, the NFC device 10*a* may be operated in the reader mode. The transmit unit 250 may continuously provide the carrier signal CW to the matching circuit 100 and may continuously radiate the carrier wave corresponding to the carrier signal CW. The CPU 220 may provide the tuning control signal TCS having a sequentially increasing value to the tuning unit 260 and may sequentially increase the capacitance of the capacitive load connected to the matching circuit 100 based on the tuning control signal TCS. Further, whenever the value of the tuning control signal TCS varies under control of the CPU 220, the detection unit 270 may receive the field voltage Vf to generate the digital value DV.

In one example embodiment, the CPU 220 may compare the generated digital values with each of the other generated digital values to determine the TCS where the digital value is maximized. The TCS corresponding to a maximized digital value DV is thus provided to the tuning unit 260. In this case, the resonance frequency of the matching circuit 100 may be substantially equal to the carrier frequency included in the carrier signal CW. Thus, because the maximum voltage is generated from the matching circuit 100, the operation performance of the NFC device 10*a* may be maximized in the reader mode.

In another example embodiment, the CPU 220 may compare the generated digital values with each of the other generated digital values to determine the TCS where the digital value is maximized. The TCS corresponding to a maximized digital value DV plus the second offset is then provided to the tuning unit 260. In this case, the resonance frequency of the matching circuit 100 may be different from the carrier frequency included in the carrier signal CW by the first offset frequency corresponding to the first offset. When the maximum voltage is generated from the matching circuit 100, the noise components may be increased too. Thus, in the reader mode, the operating performance of the NFC device 10*a* may be optimized by setting the resonance frequency of the matching circuit 100 to be different from the carrier frequency by the first offset frequency according to a noise removal characteristic of the NFC device 10*a*.

Subsequently, the NFC device 10*a* may transmit the request instruction to the NFC card through the transmission unit 250 and may wait for the first time to receive a response to the request instruction. When the response to the request instruction is received from the NFC card for the first time T1, the NFC device 10*a* may start to transceive data with the NFC card. When the response to the request instruction is not received from the NFC card for the first time T1, the NFC device 10*a* may repeatedly perform the above-described operation such that the NFC device 10*a* may tune the resonance frequency of the matching circuit 100.

As describe above, even though the resonance frequency of the matching circuit 100 may vary according to external environment factors, (such as temperature or humidity), and operating environment (such as a distance between the NFC device 10*a* and the NFC card), the resonance frequency may be periodically tuned, so that the operation performance of the NFC device 10*a* may be improved.

When the transmission unit 250 is turned off to detect an NFC reader, and the matching circuit 100 receives an electromagnetic wave from an external source, the field voltage Vf may be generated at the first power terminal L1 and the second power terminal L2 in response to the electromagnetic wave. The CPU 200 may output the selection signal SS having the first logic level and the detection unit 270 may receive the field voltage Vf from the power terminals L1 and L2 to generate the digital value DV.

When the NFC reader is not proximal to the NFC device 10*a*, the field voltage Vf generated from the matching circuit 100 may be substantially zero, because external electromagnetic waves are substantially zero. However, when the NFC device 10*a* approaches an NFC reader and starts to receive the carrier wave radiated from the NFC reader, the matching circuit 100 may generate the field voltage Vf in response to the carrier wave. As the NFC device 10*a* approaches the NFC reader, the field voltage Vf generated from the matching circuit 100 may be progressively increased. When the NFC device 10*a* approaches within a predetermined distance to the NFC reader, the field voltage Vf generated by the matching circuit 100 may be increased to be equal to or greater than the level of a predetermined threshold voltage.

Thus, when the voltage corresponding to the digital value DV is equal to or greater than the predetermined threshold voltage, the CPU 220 may determine that the NFC card is detected.

When the NFC reader is detected, the NFC device 10*a* may be operated in the card mode. The CPU 220 may provide the tuning control signal TCS having a sequentially increasing value to the tuning unit 260 and may sequentially increase the capacitance of the capacitive load connected to the matching circuit 100 based on the tuning control signal TCS. Further, whenever the value of the tuning control signal TCS varies under control of the CPU 220, the detection unit 270 may receive the field voltage Vf or the inner current Iint to generate the digital value DV.

In one example embodiment, the CPU 220 may compare the generated digital values with each of the other generated digital values to determine the TCS where the digital value is maximized. The TCS corresponding to a maximized digital value DV is then provided to the tuning unit 260. In this case, the resonance frequency of the matching circuit 100 may be substantially equal to the carrier frequency included in the carrier signal CW received from the NFC reader. Thus, since the maximum voltage is generated from the resonance unit 100, the operation performance of the NFC device 10a may be maximized in the card mode.

In another example embodiment, the CPU 220 may compare the generated digital values with each of the other generated digital values to determine the TCS where the digital value is maximized. The TCS corresponding to a maximized digital value DV plus the second offset is then provided to the tuning unit 260. In this case, the resonance frequency of the matching circuit 100 may be different from the carrier frequency included in the carrier wave by the second offset frequency corresponding to the second offset. When the maximum voltage is generated from the resonance unit 100, the noise components may be increased too. Thus, in the card mode, the operation performance of the NFC device 10a may be optimized by setting the resonance frequency of the matching circuit 100 differently from the carrier frequency by the first offset frequency according to a noise removal characteristic of the NFC device 10a.

Subsequently, the NFC device 10a may wait for the first time to receive the request instruction from the NFC reader. When the request instruction is received from the NFC reader for the first time, the NFC device 10a may start to transceive data with the NFC reader. When the request instruction is not received from the NFC reader for the first time, the NFC device 10a may repeatedly perform the above-described operation such that the NFC device 10a may tune the resonance frequency of the matching circuit 100.

As describe above, even though the resonance frequency of the matching circuit 100 may vary according to external environment (such as temperature or humidity), and operating environment (such as a distance between the NFC device 10a and the NFC reader), the resonance frequency may be periodically tuned, so that the operation performance of the NFC device 10a may be improved.

As described above, because the NFC device 10a may independently set the resonance frequency for the reader mode and the card mode, even when the optimal resonance frequency required in the reader mode is different from the optical resonance frequency required in the card mode, the NFC device 10a may be set at the optimal frequency required for the reader mode and the card mode, respectively.

Figure 15:
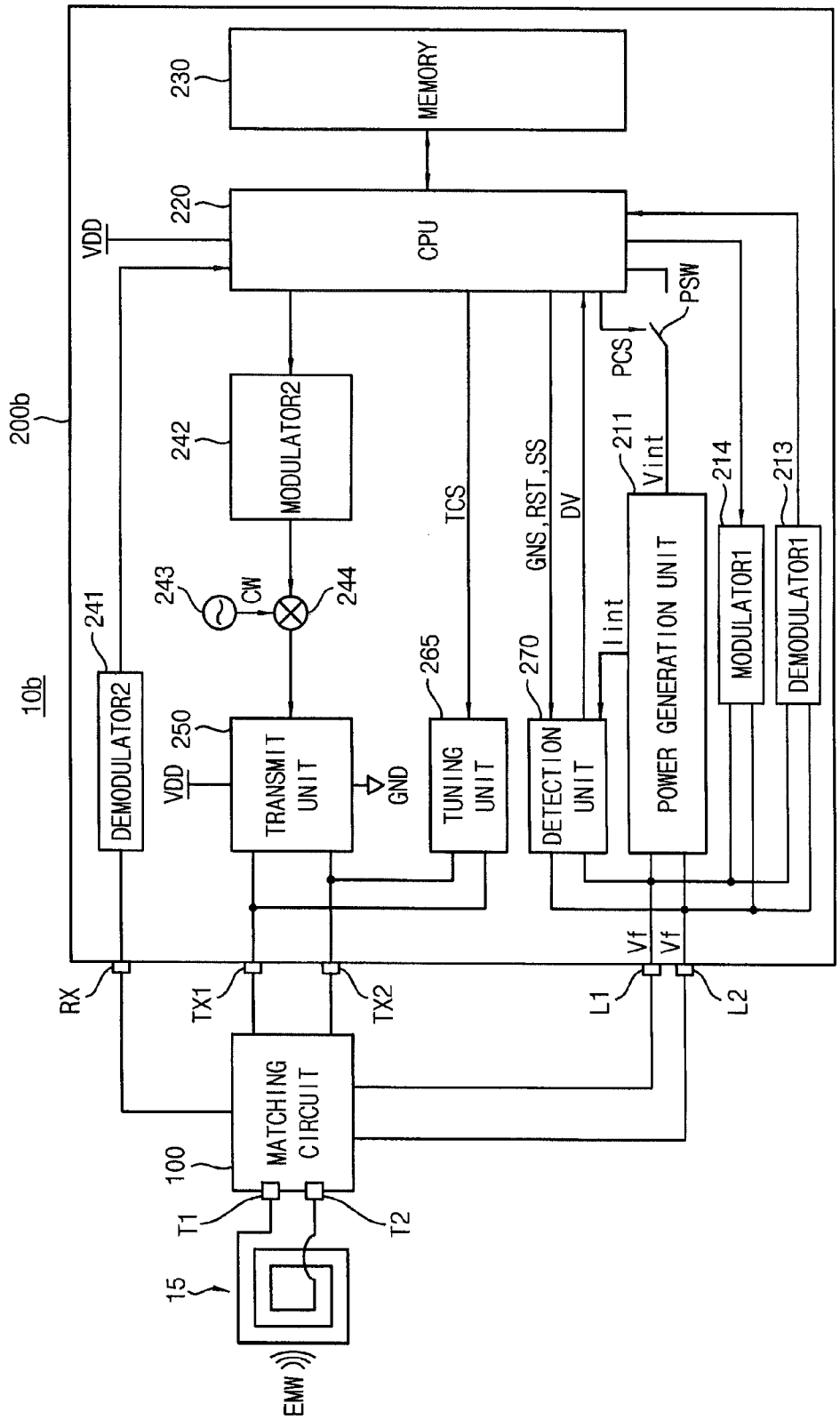
FIG. 15 is a block diagram illustrating another example of the NFC device of FIG. 1.

FIG. 15 is a block diagram illustrating another example of the NFC device of FIG. 1.

Referring to FIG. 15, an NFC device 10b may include the antenna 15, the matching circuit 100 and an NFC chip 200b.

The matching circuit 100 may employ the matching circuit 100a of FIG. 3 or the matching circuit 100b of FIG. 5 and may include the first and second capacitors C1 and C2 respectively or the second capacitor C23 as single device, either of which are connected in parallel with the antenna 15 between the first terminal T1 and the second terminal T2 of the antenna 15. Therefore, the matching circuit 100 may provide the same resonance frequency and cutoff frequency as compared to the examples shown in FIG. 4 or FIG. 6, while reducing occupied area, cost and device errors. The matching circuit 100 generates the field voltage Vf in response to the electromagnetic wave EMW and provides the field voltage Vf to the NFC chip 200b.

The NFC device 10b of FIG. 15 is similar to the NFC device 10a of FIG. 7 except that the NFC device 10b of FIG. 15 includes a tuning unit 265 instead of the tuning unit 260.

The tuning unit 265 may connect a capacitive load, (which has a capacitance corresponding to a tuning control signal TCS provided from a CPU 220), to the matching circuit 100 through the first and second transmission terminals TX1 and TX2 respectively. That is, the tuning unit 260 included in the NFC device 10a of FIG. 7 connects the capacitive load between the first power terminal L1 and the ground voltage GND and between the second power terminal L2 and the ground voltage GND. In contrast, the tuning unit 265 included in the NFC device 10b of FIG. 15 connects the capacitive load between the first transmission terminal TX1 and the ground voltage GND and between the second transmission terminal TX2 and the ground voltage GND.

The tuning operation used by the tuning unit 265 is similar to the operation used by the tuning unit 260, however communication with the matching circuit 100 occurs though the transmission terminals rather than the power the terminals—both pairs of terminals of which are connected to the matching circuit 100. Accordingly, the operation of the NFC device 10b of FIG. 15 is substantially the same as that of the NFC device 10a of FIG. 7, FIG. 16 is a block diagram illustrating still another example of the NFC device of FIG. 1.

Figure 16:
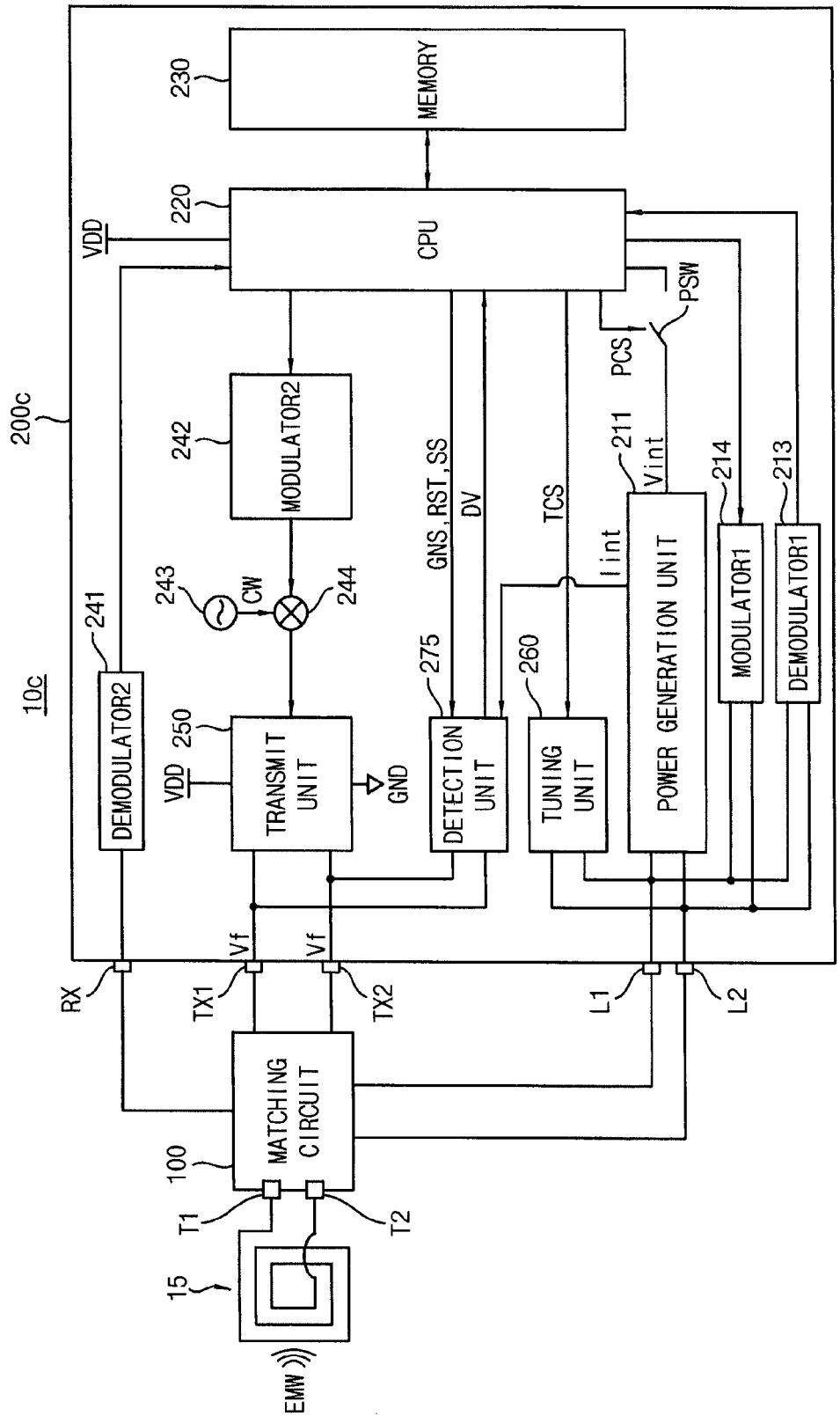
FIG. 16 is a block diagram illustrating still another example of the NFC device of FIG. 1.

Referring to FIG. 16, an NFC device 10c may include the antenna 15, a matching circuit 100 and an NFC chip 200c.

The matching circuit 100 may employ the matching circuit 100a of FIG. 3 or the matching circuit 100b of FIG. 5 and may include the first and second capacitors C1 and C2 or the second capacitor C23 as single device, either of which are connected in parallel with the antenna 15 between the first and second terminals T1 and T2 respectively of the antenna 15. Therefore, the matching circuit 100 may provide same resonance frequency and cutoff frequency as compared to the examples shown in FIG. 4 or FIG. 6 while reducing occupied area, cost and device errors. The matching circuit 100 generates the field voltage Vf in response to the electromagnetic wave EMW and provides the field voltage Vf to the NFC chip 200c.

The NFC device 10c of FIG. 16 is similar to the NFC device 10a of FIG. 7 except that the NFC device 10c of FIG. 16 includes a detection unit 275 instead of the detection unit 270.

The detection unit 275 is connected to the first and second transmission terminals TX1 and TX2 respectively. The detection unit 275 may convert one of the field voltage Vt received through the first and second transmission terminals TX1 and TX2 respectively and the inner current Iint provided from the power generation unit 211 into the digital value DV based on the control signals GNS, RST and SS provided from the CPU 220 and may provide the digital value DV to the CPU 220. With reference to FIG. 7 and FIG. 16, the detection unit 270 of FIG. 7 uses a field voltage Vf received from the power terminals L1 and L2, while the detection unit 275 of FIG. 16 uses a field voltage Vf received from the transmission terminals TX1 and TX2. Similarly with respect to the detection unit 275 of FIG. 16, the voltage between the transmission terminals TX1 and TX2 may be substantially equal to or similar to the voltage between the power terminals L1 and L2.

Accordingly, the operation of the NFC device 10c of FIG. 16 is substantially similar to that of the NFC device 10a of FIG. 7.

Figure 17:
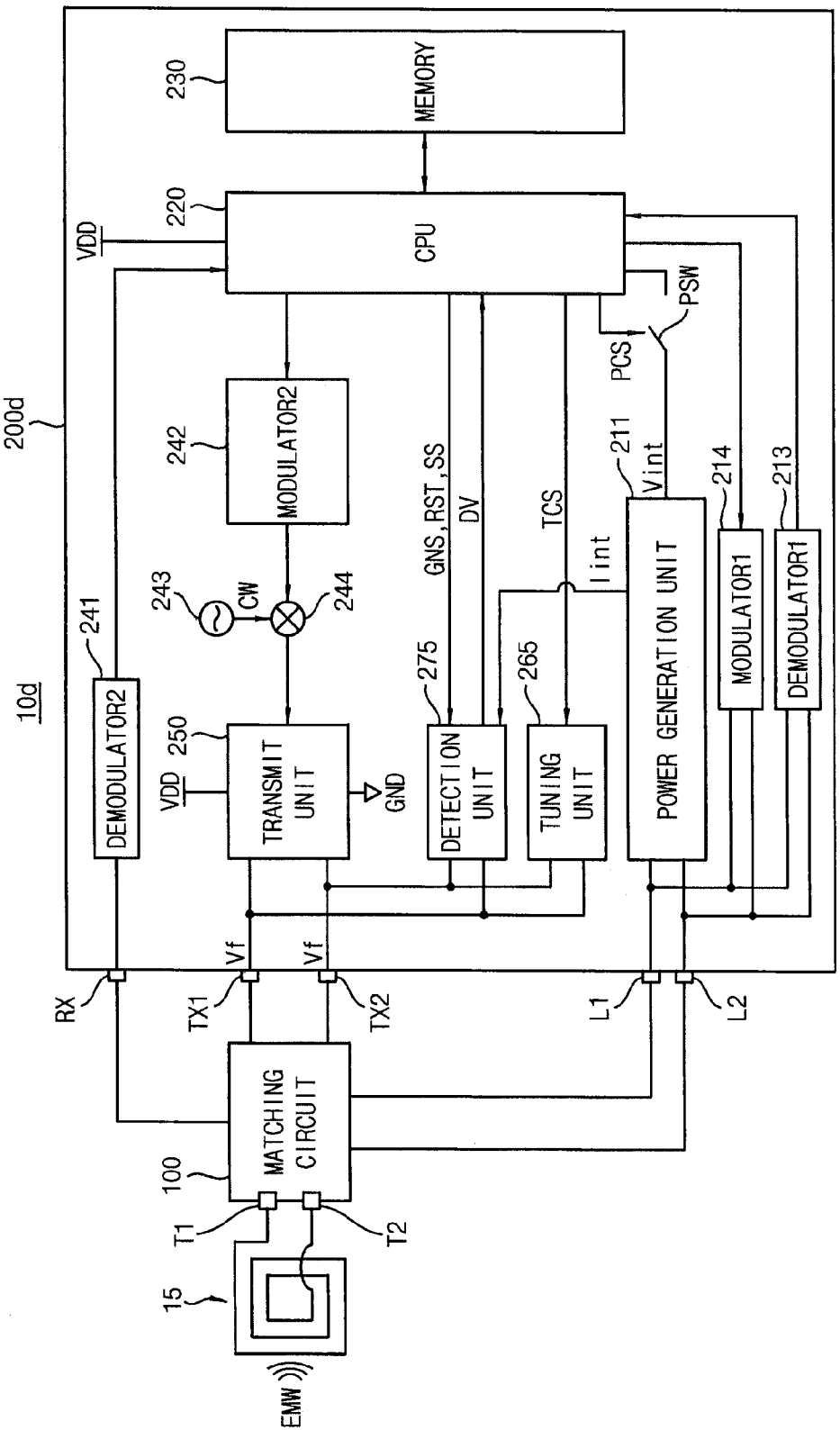
FIG. 17 is a block diagram illustrating still another example of the NFC device of FIG. 1.

FIG. 17 is a block diagram illustrating another example of the NFC device of FIG. 1.

Referring to FIG. 17, an NFC device 10d may include the antenna 15, the matching circuit 100 and an NFC chip 200d.

The NFC device 10d of FIG. 17 is similar to the NFC device 10a of FIG. 7, except that the NFC device 10d of FIG. 17 includes a tuning unit 265 and the detection unit 275 instead of the tuning unit 260 and the detection unit 270.

The tuning unit 265 is the same as the tuning unit 265 included in the NFC device 10b of FIG. 15 and the detection unit 275 is the same as the detection unit 275 included in the NFC device 10c of FIG. 16.

Accordingly, the operation of the NFC device 10d of FIG. 17 is substantially the same as that of the NFC device 10a of FIG. 7.

Figure 18:
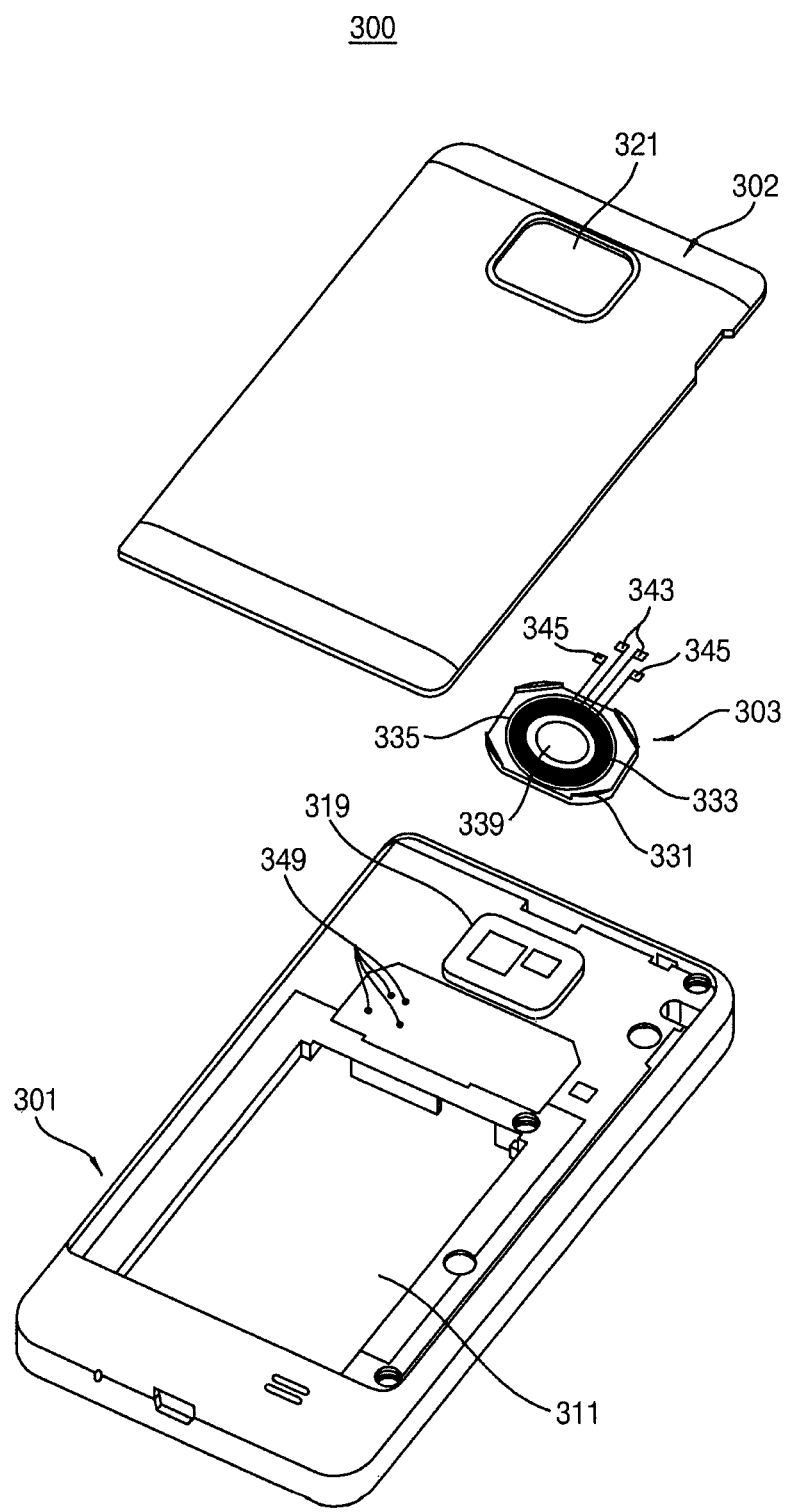
FIG. 18 is an exploded perspective view of a portable terminal according to some embodiments.

FIG. 18 is an exploded perspective view of a portable terminal (for example a "cell phone") according to some embodiments.

Figure 19:
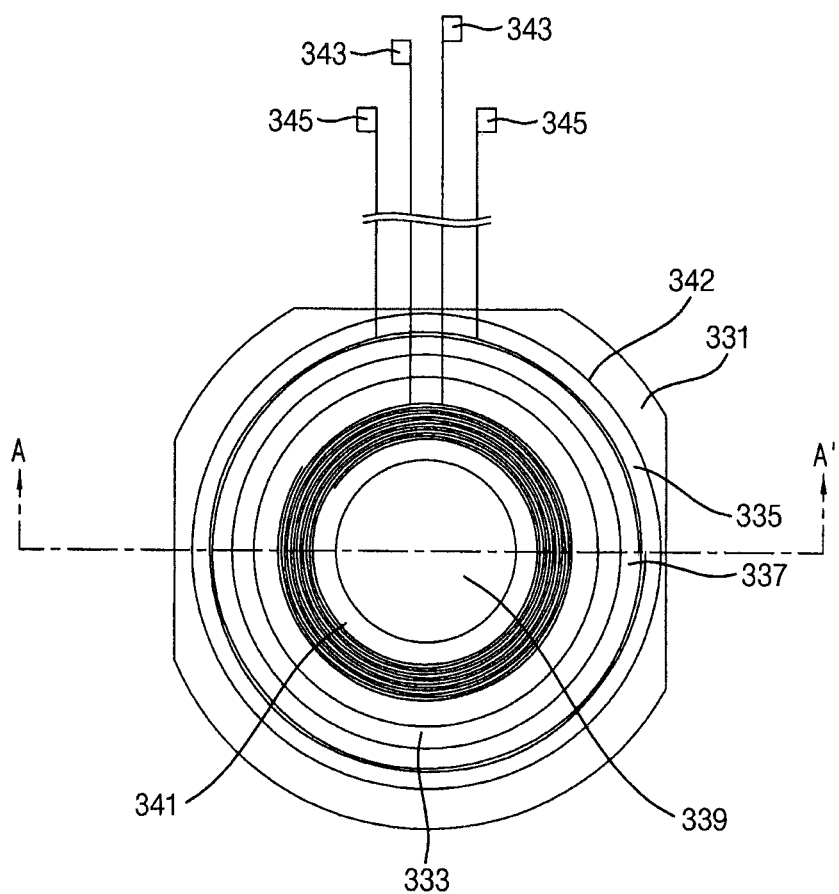
FIG. 19 is a plan view of a coil module in the portable terminal of FIG. 18.

FIG. 19 is a plan view of a coil module in the portable terminal of FIG. 18.

Figure 20:
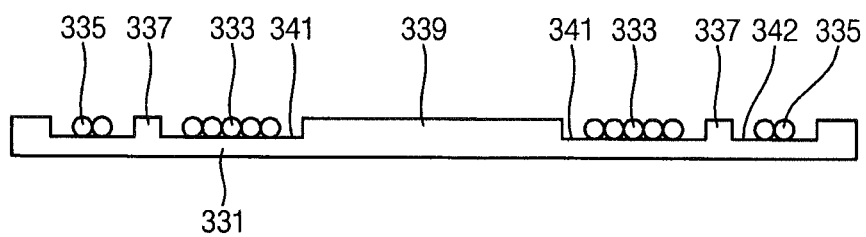
FIG. 20 is a cross-sectional view of the coil module in FIG. 19 taken along A-A'.

FIG. 20 is a cross-sectional view of the coil module in FIG. 19 taken along A-A'.

Referring to FIG. 18, FIG. 19 and FIG. 20, a portable terminal 300 includes a shielding member 331 attached to an inner surface of an external part such as a battery cover 302 or a housing 301, and a pair of coils 333 and 335 attached to the shielding member 331. The coils 333 and 335 are mounted on a same plane. The shielding member 331 and the coils 333 and 335 are collectively referred to herein as a coil module 303.

Referring to FIG. 18, the portable terminal 300 is a bar type terminal having a touch screen display. Other types of terminals are envisioned within the scope of this disclosure, including different physical form factors and display types. While not shown, the display, function keys (such as Start/End and Select keys), a transmitter, and a receiver are installed on a front surface of the housing 301.

The housing 301 is provided on a rear surface of the portable terminal 300, with a battery mounting recess 311 for accommodating a battery pack. The battery cover 302 covers the battery mounting recess 311. A plurality of terminals 349 and a camera module 319 are installed at one side of the battery mounting recess 311, with the terminals 349 also being covered by the battery cover 302. An opening 321 penetrates through both surfaces of the battery cover 302. The camera module 319 is accommodated in the opening 321, thereby securing a capturing path. At least one of a connector terminal, a memory slot, a volume key, and a camera shutter switch (not shown) may be arranged on a side surface of the housing 301.

The coil module 303 is attached to the inner surface of the battery cover 302 and is connected to the circuits of the portable terminal 300, (e.g. a communication circuit or a charging circuit) via the plurality of terminals 349. As illustrated in FIG. 18, FIG. 19 and FIG. 20, the coil module 303 includes the shielding member 331 and the coils 333 and 335.

The shielding member 331 may be formed by injection molding, having first and second accommodation grooves 341 and 342 respectively on a surface thereof. The first and second accommodation grooves 341 and 342 respectively are circular in shape and recessed into one surface of the shielding member 331. The second accommodation groove 342 surrounds the first accommodation groove 341, being concentric with the first accommodation groove 341. A shielding wall 337 is interposed between the first and second accommodation grooves 341 and 342.

A pellet comprised of a mixture of metal powder containing an iron (Fe) component and synthetic resin is injection-molded into the shielding member 331. The synthetic resin is preferably Poly Carbonate (PC), Poly Amide (PA), Acrylonitrile-Butadiene-Styrene (ABS) copolymer, or Nylon. As stated above, the shielding member 331 contains the iron component which prevents mutual interference between the coils 333 and 335, and prevents the coils 333 and 335 from impacting circuits within the portable terminal 300, caused by electronic waves generated from high-frequency waves, low-frequency waves, or power applied to the coils 333 and 335.

As illustrated in FIGS. 19 and 20, the first coil 333 is accommodated in the first accommodation groove 341 and the second coil 335 is accommodated in the second accommodation groove 342. The first coil 333 and the second coil 335 are formed by spirally winding enamel-insulated conductor wires.

The first coil 333 and the second coil 335 are accommodated in the first and second accommodation grooves 341 and 342, respectively, and the second coil 335 surrounds the first coil 333. Herein, the shielding wall 337 between the first coil 333 and the second coil 335 provides a shielding effect between the coils. In other words, the shielding wall 337 shields interference of electronic waves between the first and second coils 333 and 335 respectively. The first coil 333 and the second coil 335 have connection ends 343 and 345, respectively, extended from one side of the shielding member 331. The connection ends 343 and 345 are connected to circuits of the portable terminal 300 via the plurality of terminals 349 provided on the housing 301.

When installed, the first coil 333 and the second coil 335 are exposed from one surface of the shielding member 331. However, the first coil 333 and the second coil 335 face the inner surface of the battery cover 302 when the shielding member 331 is attached to the battery cover 302, thereby covering the first and second coils 333 and 335 respectively. Consequently, the first coil 333 and the second coil 335 are covered by the shielding member 331 and the battery cover 302.

One of the first and second coils 333 and 335 respectively may be used as a secondary coil for wireless charging and the other coil may be used as an NFC antenna element. The coils 333 and 335 may also be used as antennas for short-range wireless communication, (e.g. Bluetooth™ or terrestrial multimedia broadcasting antennas). The embodiments of the inventive concepts utilize the first coil 333 as a secondary coil for wireless charging and utilize the second coil 335 as an NFC antenna element.

For wireless charging, the portable terminal 300 may be cradled on a charging cradle (not shown) to align a primary coil of a charger with the secondary coil of the portable terminal 300 corresponding to the first coil 333. Alternatively, the primary coil is movably mounted in the charging cradle such that when the portable terminal 300 is positioned on the charging cradle, the primary coil is moved to align with the portable terminal 300.

To align the primary coil of the charging cradle with the first coil 333 of the portable terminal 300, the shielding member 331 may have a protrusion portion 339. The protrusion portion 339 protrudes from the first accommodation groove 341 of the shielding member 331. Because the shielding member 331 contains an iron component, the protrusion portion 339 also contains an iron component. That is, because the protrusion portion 339 contains a paramagnetic material, (e.g. the iron component), when the protrusion portion 339 is positioned within the magnetic field of a permanent magnet, an attraction force of the permanent magnet pulls on the protrusion portion 339.

The permanent magnet is attached to the primary coil of the charging cradle. When the portable terminal 300 is mounted on the charging cradle, the attraction force between the permanent magnet and the shielding member 331, (particularly the protrusion portion 339), aligns the primary coil of the charging cradle with the first coil 333 of the portable terminal 300. Furthermore, while the protrusion portion 339 contains the iron component and thus has a paramagnetic property, the protrusion portion 339 may have an additional magnetic portion attached on the first accommodation groove 341 to increase the attraction force between the permanent magnet of the primary coil and the shielding member 331. Preferably, the additional magnetic portion is formed of a paramagnetic material.

Figure 21:
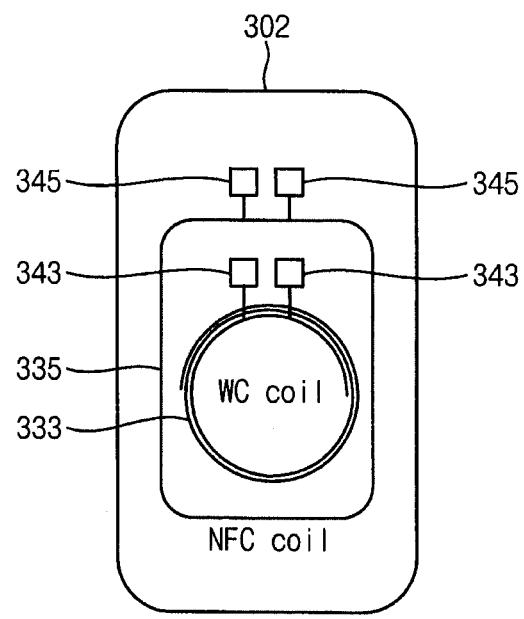
FIG. 21 illustrates mounting of the coil module of FIG. 19 to a battery cover of the portable terminal of FIG. 18 according to some embodiments.

FIG. 21 illustrates mounting of the coil module of FIG. 19 to a battery cover of the portable terminal according to some embodiments.

Figure 22:
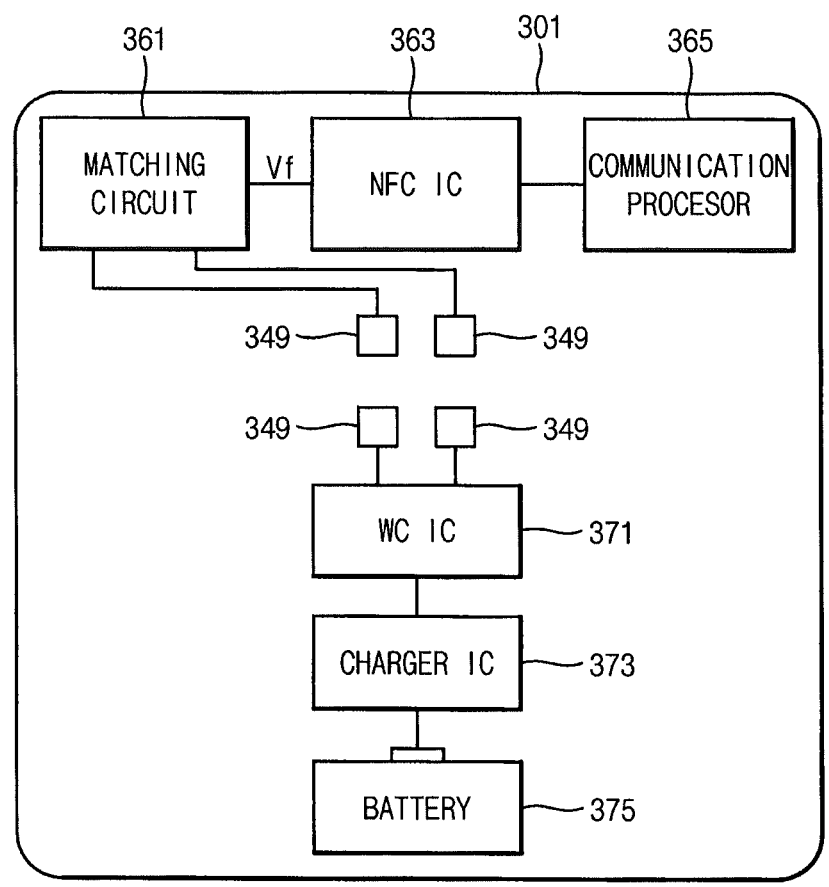
FIG. 22 is a schematic view of the portable terminal of FIG. 18, with which the battery cover illustrated in FIG. 21 is combinable.

FIG. 22 is a schematic view of the portable terminal of FIG. 18, with which the battery cover illustrated in FIG. 21 is combinable.

FIG. 21 and FIG. 22 illustrate configurations of a portable terminal that implements both a wireless charging function and an NFC function using the coil module 303, with the first coil 333 as a secondary coil used for wireless charging and the second coil 335 as an antenna element for NFC, by way of example.

FIG. 21 illustrates mounting of the coil module 303 on the battery cover 302 of the portable terminal 300 and FIG. 22 illustrates the housing 301 to be combined with the battery cover 302 illustrated in FIG. 21.

To implement the wireless charging function and the NFC function using the first and second coils 333 and 335 respectively, the coils 333 and 335 are connected to a communication processor 365 and a charge integrated circuit (IC) 373, respectively. A matching circuit 361 and an NFC IC 363 or a wireless charger (WC) IC 371 is disposed on a connection of the first coil 333 or the second coil 335 to a circuit of the portable terminal 300. These ICs control current and voltage during charging. The matching circuit 361 may employ the matching circuit 100*a* of FIG. 3 or the matching circuit 100*b* of FIG. 5, and may include the first and second capacitors C1 and C2 respectively or the second capacitor C23 as single device, either of which are connected in parallel with the antenna 15 between the first and second terminals of the antenna. Therefore, the matching circuit 361 may provide the same resonance frequency and cutoff frequency as comparing example of FIG. 4 or FIG. 6 while reducing occupied area, cost and device errors. The matching circuit 361 generates the field voltage Vf and provides the field voltage Vf to the NFC IC 363.

According to the embodiment in FIG. 21 and FIG. 22, the NFC IC 363 is connected to the communication processor 365 of the portable terminal 300 and to the second coil 335 mounted to the battery cover 302 via the plurality of terminals 149. The charger IC 373 is installed inside the portable terminal 300 and connected to the battery pack. In addition, the WC IC 371 is connected to the charger IC 373 inside the portable terminal 300 and to the first coil 333 mounted to the battery cover 302 through the remaining plurality of terminals 349.

Figure 23:
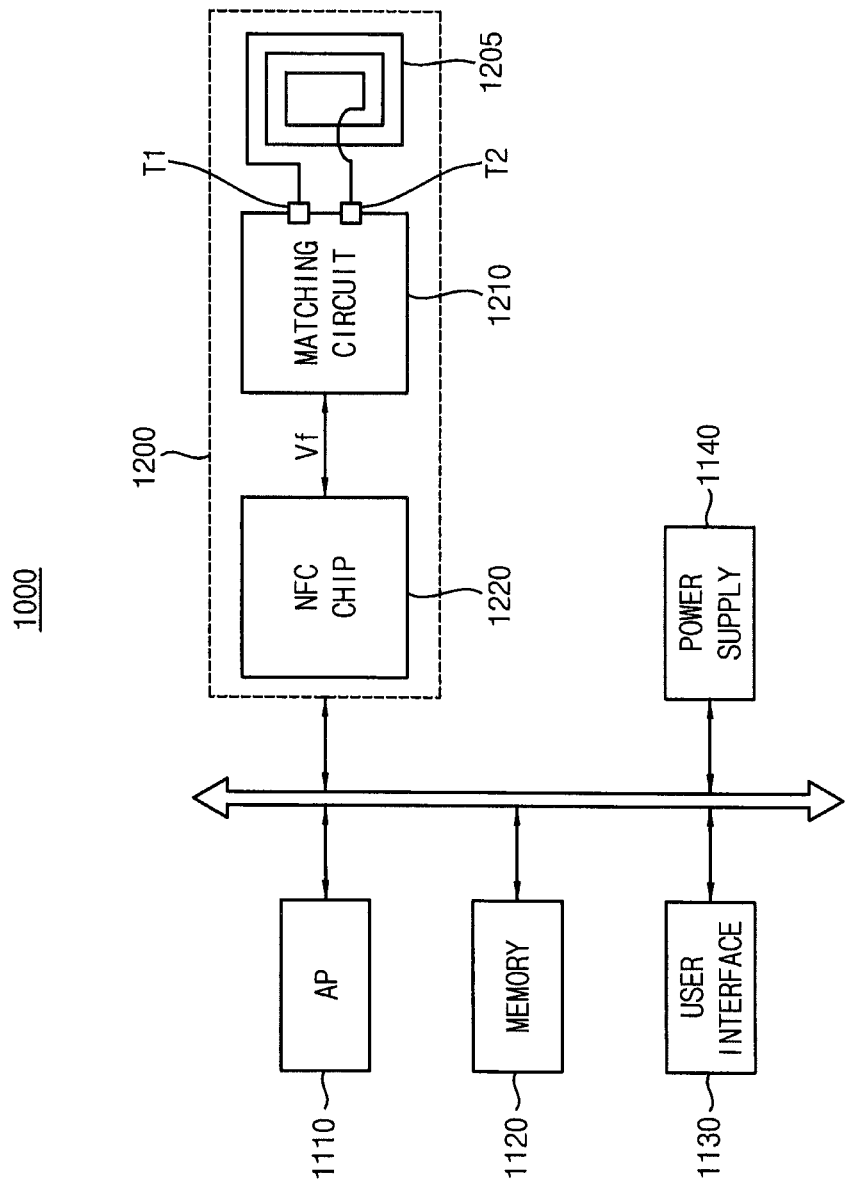
FIG. 23 is a block diagram illustrating an electronic system with an NFC device according to some embodiments.

FIG. 23 is a block diagram illustrating an electronic system according to some embodiments.

Referring to FIG. 23, an electronic system 1000 includes an application processor 1110, an NFC device 1200, a memory device 1120, a user interface 1130 and a power supply 1140. In some embodiments, the electronic system 1000 may be a mobile phone, a smart phone, a personal digital assistant (PDA), a portable multimedia player (PMP), a digital camera, a music player, a portable game console, a navigation system, a laptop computer, or the like.

The application processor 1110 may control overall operations of the electronic system 1000. The application processor 1110 may execute applications, such as a web browser, a game application, a video player, etc. In some embodiments, the application processor 1110 may include a single core or multiple cores. For example, the application processor 1110 may be a multi-core processor, such as a dual-core processor, a quad-core processor, a hexa-core processor, etc. The application processor 1110 may include an internal or external cache memory.

The memory device 1120 may store data required for an operation of the electronic system 1000. For example, the memory device 1120 may store a boot image for booting the electronic system 1000, output data to be outputted to an external device and input data received from the external device. For example, the memory device 1120 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM) or a ferroelectric random access memory (FRAM).

The NFC device 1200 may provide the output data stored in the memory device 1120 to the external device through NFC and store the input data received from the external device through NFC into the memory device 1120. The NFC device 1200 may include an antenna 1205, a matching circuit 1210 and an NFC chip 1220. The matching circuit 1210 may employ the matching circuit 100*a* of FIG. 3 or the matching circuit 100*b* of FIG. 5 and may include the first and second capacitors C1 and C2 respectively or the second capacitor C23 as single device, either of which are connected in parallel with the antenna 1205 between the first terminal T1 and the second terminal T2 of the antenna 1205. Therefore, the matching circuit 1210 may provide the same resonance frequency and cutoff frequency as comparing example of FIG. 4 or FIG. 6 while reducing occupied area, cost and device errors. The matching circuit 1210 generates the field voltage Vf in response to the electromagnetic wave and provides the field voltage Vf to the NFC chip 1220. The NFC device 1200 may be embodied with the NFC device 10 of FIG. 1. A structure and an operation of the NFC device 10 are described above with reference to FIG. 7 through FIG. 17.

The user interface 1130 may include at least one input device, such as a keypad or a touch screen, and at least one output device, such as a speaker or a display device. The power supply 1140 may supply a power supply voltage to the electronic system 1000.

In some embodiments, the electronic system 1000 may further include an image processor, and/or a storage device, such as a memory card, a solid state drive (SSD), a hard disk drive (HDD) or a CD-ROM.

In some embodiments, the electronic system 1000 and/or components of the electronic system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

As mentioned above, a matching circuit of an NFC device includes first and second capacitors or a second capacitor as single device, either of which are connected in parallel with an antenna between first and second terminals of the antenna. Therefore, the matching circuit may provide the same resonance frequency and cutoff frequency as a case when the first and second capacitors are replaced by two replacement capacitors, respectively while reducing occupied area, cost and device errors.

The example embodiments may be employed in an electronic device including an NFC device. For example, the example embodiments may be applicable to a mobile phone, a smart phone, a personal digital assistant (PDA), a portable multimedia player (PMP), a digital camera, a music player, a portable game console, a navigation system or a laptop computer.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A matching circuit of a near field communication (NFC) device comprising:
   a resonance unit connected between a first terminal and a second terminal of an antenna, the antenna responsive to an electromagnetic wave, the resonance unit including a first capacitor connected between the first terminal and the second terminal of the antenna; and
   a matching unit configured to perform impedance matching between the antenna and an NFC chip, the matching unit being connected between the first terminal and the second terminal of the antenna,
   wherein a first terminal of the first capacitor is directly connected to the first terminal of the antenna, and a second terminal of the first capacitor is directly connected to the second terminal of the antenna.

2. The matching circuit of claim 1, wherein the matching unit includes at least a second capacitor, which is capacitively coupled in parallel with the first capacitor, and
   the first capacitor is replaced by two first replacement capacitors connected in series between the first terminal and the second terminal, each first replacement capacitor having a same first replacement capacitance and a first replacement quality factor being less than a first quality factor of the first capacitor, each first replacement capacitor having the first replacement capacitance substantially twice a first capacitance of the first capacitor.

3. The matching circuit of claim 2, wherein a resonance frequency provided by the resonance unit is substantially the same using the first capacitor as when the resonance unit uses the two first replacement capacitors.

4. The matching circuit of claim 3, wherein the resonance frequency is determined based on an inductance of the antenna and the first capacitance.

5. The matching circuit of claim 2, wherein the second capacitor is replaced by two second replacement capacitors connected in series, each second replacement capacitor having a same second replacement capacitance and a second replacement quality factor being less than a second quality factor of the second capacitor, each second replacement capacitor having the second replacement capacitance substantially twice a second capacitance of the second capacitor.

6. The matching circuit of claim 5, wherein a cut-off frequency provided by the matching unit is substantially the same using the second capacitor as when the matching unit uses the two second replacement capacitors.

7. The matching circuit of claim 6, further comprising:
   a third capacitor connected to the first capacitor at the first terminal of the antenna and connected to the second capacitor at a third node;
   a fourth capacitor connected to the first capacitor at the second terminal of the antenna and connected to the second capacitor at a fourth node;
   a first inductor connected between the third node and a first transmission terminal of the NFC chip; and
   a second inductor connected between the fourth node and a first transmission terminal of the NFC chip.

8. The matching circuit of claim 7, wherein the cut-off frequency is determined from capacitance values of the second capacitor, the third capacitor, and the fourth capacitor, and inductive values of the first inductor and the second inductor.

9. The matching circuit of claim 7, wherein each of the third capacitor and the fourth capacitor has a same third capacitance and the second capacitance is half of the third capacitance.

10. A near field communication (NFC) device comprising:
    an antenna;
    a matching circuit connected between a first terminal and a second terminal of the antenna, the matching circuit configured to generate a field voltage in response to an electromagnetic field detected by the antenna; and
    an NFC chip configured to detect one of an NFC card and an NFC reader proximal to the NFC chip based on a magnitude of the field voltage, configured to operate in a reader mode when the NFC card is detected and configured to operate in a card mode when the NFC reader is detected,
    wherein the matching circuit includes a second capacitor capacitively coupled in parallel with the antenna between the first terminal and second terminal of the antenna, and the matching circuit configured to substantially match an impedance of the antenna to an impedance of the NFC chip, and
    a first terminal of the second capacitor is connected to the first terminal of the antenna, and a second terminal of the second capacitor is connected to the second terminal of the antenna.

11. The NFC device of claim 10, wherein the matching circuit further comprises:
    a resonance unit including a first capacitor being directly connected in parallel with the antenna between the first and second terminals of the antenna.

12. The NFC device of claim 11, wherein the first capacitor is replaced by two first replacement capacitors connected in series, each first replacement capacitor having a same first replacement capacitance and a first replacement quality factor being less than a first quality factor of the first capacitor, each first replacement capacitor having the first replacement capacitance substantially twice a first capacitance of the first capacitor.

13. The NFC device of claim 12, wherein a resonance frequency provided by the resonance unit is substantially the same using the first capacitor as when the resonance unit uses the two first replacement capacitors.

14. The NFC device of claim 12, wherein the second capacitor is replaced by two second replacement capacitors connected in series, each second replacement capacitor having a same second replacement capacitance and a second replacement quality factor being less than a second quality factor of the second capacitor, each second replacement capacitor having the second replacement capacitance substantially twice a second capacitance of the second capacitor.

15. The NFC device of claim 14, wherein a cut-off frequency provided by the matching circuit is substantially the same using the second capacitor as when the matching circuit uses the two second replacement capacitors.

16. The NFC device of claim 10, wherein the NFC chip is connected to the matching circuit through a reception terminal, a first transmission terminal, a second transmission terminal, a first power terminal and a second power terminal.

17. The NFC device of claim 10, wherein the NFC chip comprises:
   a transmission unit configured to provide a carrier signal to the matching circuit through a transmission terminal;
   a power generation unit configured to generate an inner current and an inner voltage having a predetermined voltage level using a voltage provided from the matching circuit;
   a detection unit configured to convert one of the magnitude of the field voltage and a magnitude of the inner current into a digital value;
   a tuning unit configured to connect a capacitive load having a capacitance corresponding to a tuning control signal to the matching circuit; and
   a central processing unit (CPU) configured to control the transmission unit, the detection unit and the tuning unit, to detect the NFC card based on the digital value and a first threshold voltage, to detect the NFC reader based on the digital value and a second threshold voltage, to generate a first tuning control signal based on the digital value in the reader mode, and to generate a second tuning control signal based on the digital value in the card mode.

18. The NFC device of claim 17, wherein the tuning unit connects the capacitive load between a terminal receiving the field voltage from the matching circuit and a ground voltage.

19. The NFC device of claim 17, wherein the tuning unit connects the capacitive load between the transmission terminal and a ground voltage.

* * * * *